United States Patent [19]
Johnston et al.

[11] Patent Number: 5,682,442
[45] Date of Patent: *Oct. 28, 1997

[54] IMAGE PROCESSING SYSTEM

[75] Inventors: James David Johnston, Warren, N.J.; David Lee Neuhoff, Ann Arbor, Mich.; Thrasyvoulos Nicholaou Pappas, Summit; Robert James Safranek, New Providence, both of N.J.

[73] Assignee: Lucent Technologies Inc., Murray Hill, N.J.

[*] Notice: The term of this patent shall not extend beyond the expiration date of Pat. No. 5,309,526.

[21] Appl. No.: 237,500

[22] Filed: May 3, 1994

Related U.S. Application Data

[63] Continuation of Ser. No. 785,673, Oct. 31, 1991, Pat. No. 5,309,526, which is a continuation-in-part of Ser. No. 350,435, May 4, 1989, abandoned, and a continuation-in-part of Ser. No. 659,793, Feb. 22, 1991, abandoned, and a continuation-in-part of Ser. No. 763,002, Sep. 20, 1991, abandoned.

[51] Int. Cl.$^6$ ........................................ G06K 9/36
[52] U.S. Cl. .................. 382/239; 382/252; 358/261.2; 358/429
[58] Field of Search .................. 382/54, 56, 239, 382/248, 251, 252; 358/429, 430, 261.1, 261.2, 261.3

[56] References Cited

U.S. PATENT DOCUMENTS

| | | | |
|---|---|---|---|
| 4,084,196 | 4/1978 | Tisue et al. | 358/283 |
| 4,580,162 | 4/1986 | Mori | 358/13 |
| 4,922,273 | 5/1990 | Yonekawa et al. | 358/429 |
| 5,121,216 | 6/1992 | Chen et al. | 382/56 |
| 5,191,640 | 3/1993 | Plass | 395/100 |

FOREIGN PATENT DOCUMENTS

| | | |
|---|---|---|
| 0493101 A2 | 7/1992 | European Pat. Off. . |
| WO 90/04898 | 5/1990 | WIPO ............ H04N 1/40 |
| WO 90/09075 | 8/1990 | WIPO ............ H04N 1/40 |

OTHER PUBLICATIONS

European Search Report.

G. Goertzel and G. R. Thompson, "Digital Halftoning on the IBM 4250 Printer," *IBM J. Res. Develop.*, vol. 31, No. 1, 2–15, Jan. 1987.

P. Stucki, "MECCA—A Multiple-Error Correction Computation Algorithm for Bi-Level Image Hardcopy Reproduction," IBM Zurich Research Laboratory, Communications/Computer Science/Engineering Technology, 46 pages, Mar. 2, 1981.

(List continued on next page.)

*Primary Examiner*—Leo Boudreau
*Assistant Examiner*—Chris Kelley
*Attorney, Agent, or Firm*—Thomas A. Restaino; Kenneth M. Brown

[57] ABSTRACT

An image-processing system for perceptual coding of an image is disclosed. Coding is accomplished through an analysis of human visual sensitivity to noise in halftone images and an analysis of one or more signals representing the image to be coded. These analyses determine levels of noise. A first image is encoded so as to produce encoded values without introducing noise which exceeds a determined level of noise. Analysis of human visual sensitivity is carried out under a set of user determined conditions comprising viewing distance and lighting. The encoded image is communicated and decoded to produce representation of the first image for display. As part of displaying the representation of the first image, a halftoning process is carried out. The halftoning process may comprise the interpolation of data values of the representation of the first image as well as the addition of micro-dither to the representation. Illustrative halftoning techniques include classical halftoning, least-squares halftoning, and error diffusion halftoning. Printer model-based halftoning techniques for both least-squares halftoning and error diffusion halftoning are presented. Applications of the model-based halftoning techniques for systems employing conventional coding of images are also discussed.

45 Claims, 17 Drawing Sheets

OTHER PUBLICATIONS

R. Ulichney, "Digital Halftoning," The MIT Press, 239–242 (1987).

R. W. Floyd and L. Steinberg, "An Adaptive Algorithm for Spatial Grey Scale," Proc. SID, vol. 17/2, 75–77 (1976).

D. Anastassiou, "Error Diffusion Coding for A/D Conversion," IEEE Trans. Cir. Sys., vol. CAS-36, No. 9, 1175–1186 (Sep. 1989).

J. P. Allebach, "Visual Model–Based Algorithms for Halftoning Images," Proc. SPIE, vol. 310—Image Quality, 151–158 (1981).

P. G. Roetling and T. M. Holladay, "Tone Reproduction and Screen Design for Pictorial Electrographic Printing," Appl. Photo. Eng., vol. 5, No. 4, 179–182 (1979).

J. L. Mannos and D. J. Sakrison, "The Effects of a Visual Fidelity Criterion on the Encoding of Images," IEEE Trans. on Information Theory, vol. IT-20, No. 4, 525–536 (Jul. 1974).

A. K. Jain, "Fundamentals of Digital Image Processing," Prentice Hall, 56–57 (1989).

T. N. Cornsweek, "Visual Perception," (A book) Academic Press (1970).

A. N. Netravali and B. G. Haskell, "Digital Pictures: Representations and Compression," Plenum, 292–297 (1988).

J. F. Jarvis, C. N. Judice and W. H. Ninke, "A Survey of Techniques for the Display of Continuous Tone Pictures on Bilevel Displays," Comp. Graphics and Image Processing, vol. 5, 13–40 (1976).

G. D. Forney, Jr., "The Viterbi Algorithm," IEEE Proc., vol. 61, No. 3, 268–278 (Mar. 1973).

A. J. Viterbi, "Error Bounds for Convolutional Codes and an Asymptotically Optimum Decoding Algorithm," IEEE Trans. on Information Theory, vol. IT-13, No. 2, 260–269 (Apr. 1967).

G. Ungerboeck, "Adaptive Maximum–Likelihood Receiver for Carrier–Modulated Date–Transmission Systems," IEEE Trans. on Comm., vol. COMM-22, No. 5, 624–636 (May 1974).

A. S. Acampora, "Maximum Likelihood Decoding of Binary Convolutional Codes on Band–Limited Satellite Channels," Natl. Telecomm. Conf., 24.5-1–24.5-5 (1976).

A. J. Viterbi and J. K. Omura, "Principles of Digital Communications and Coding," McGraw–Hill, 272–277 (1979).

L. G. Roberts, "Picture Coding Using Pseudo–Random Noise," IRE Transactions on Information Theory, 145–154 (Feb. 1962).

ISO/IEC Committee Draft 11544, "Coded Representation of Picture and Audio Information—Progressive Bi–level Image Compression," WG9–S1R4 (Sep. 11, 1991).

Y. Yasuda, Y. Yamazaki, T. Kamae and K. Kobayashi, "Advances in FAX," Proceedings of the IEEE, vol. 73, No. 4, 706–730 (Apr. 1985).

National Communications System, Technical Information Bulletin 88–5, "Investigation of Optional Compression Techniques for Dither Coding," NCS TIB 88–5 (Apr. 1988).

P. W. Westerink et al., "Sub–Band Coding of Images Using Vector Quantization," Proc. of Seventh Benelux Information Theory Symposium, 143–150 (1986).

K. N. Ngan et al., "Cosine Transform Coding Incorporating Human Visual System Model," SPIE vol. 707, Visual Communications and Image Processing, 165–171 (1986).

R. V. Cox, "The Design of Uniformly and Nonuniformly Spaced Pseudo Quadrature Mirror Filters," IEEE Trans. ASSP, vol. ASSP-34, No. 5, 1090–1096 (1986).

W. H. Chen et al., "Adaptive Coding of Monochrome and Color Images," IEEE Trans. Comm., vol. COM-25, 1285–1292 (Nov. 1987).

J. W. Woods et al., "Sub–Band Coding of Images," IEEE ASSP, vol. 34, No. 5, 1278–1288 (Oct. 1986).

H. Gharavi et al., "Sub–Band Coding of Digital Images Using Two–Dimensional Quadrature Mirror Filtering," Proc. SPIE, vol. 707, 51–61 (Sep. 1986).

| BANDS | 0 | 1 | 2 | 3 |
|---|---|---|---|---|
| 0 | 0.25 | 0.4 | 2.0 | 6.0 |
| 1 | 0.5 | 1.0 | 4.0 | 8.0 |
| 2 | 2.0 | 3.0 | 6.0 | 9.0 |
| 3 | 3.0 | 6.0 | 10.0 | 11.0 |

FIG. 24
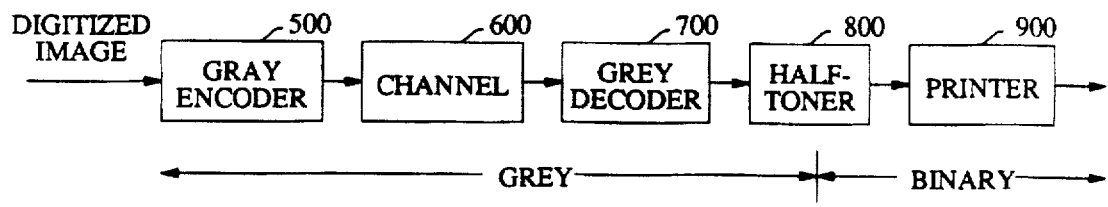
FIG. 25
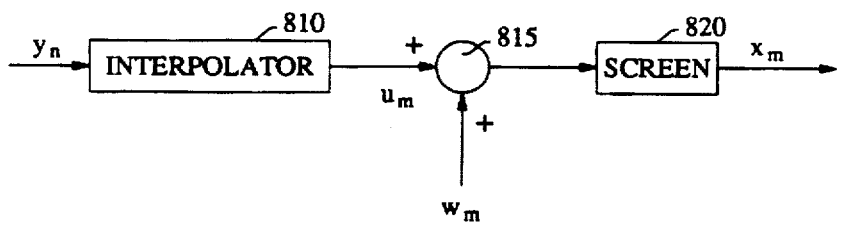
FIG. 26
| 108 | 93  | 100 | 124 | 147 | 162 | 155 | 131 |
| --- | --- | --- | --- | --- | --- | --- | --- |
| 39  | 31  | 23  | 77  | 216 | 224 | 232 | 178 |
| 46  | 8   | 15  | 85  | 209 | 247 | 240 | 170 |
| 70  | 54  | 62  | 116 | 185 | 201 | 193 | 139 |
| 147 | 162 | 155 | 131 | 108 | 93  | 100 | 124 |
| 216 | 224 | 232 | 178 | 39  | 31  | 23  | 77  |
| 209 | 247 | 240 | 170 | 46  | 8   | 15  | 85  |
| 185 | 201 | 193 | 139 | 70  | 54  | 62  | 116 |

GREY LEVEL (BLACKNESS)

IMAGE PROCESSING SYSTEM

CROSS REFERENCE TO RELATED APPLICATION

This application is a continuation of U.S. patent application Ser. No. 07/785,673, entitled *Image-Processing System*, filed Oct. 21, 1991, now U.S. Pat. No. 5,309,526, which is (i) a continuation-in-part of U.S. patent application Ser. No. 07/350,435, entitled *Perceptually-Adapted Image Coding System*, filed May 4, 1989, now abandoned; (ii) a continuation-in-part of U.S. patent application Ser. No. 07/659,793, entitled *Model-Based Halftoning*, filed Feb. 22, 1991, now abandoned; and (iii) a continuation-in-part of U.S. patent application Ser. No. 07/763,002, entitled *Model-Based Halftoning*, filed Sep. 20, 1991, now abandoned.

FIELD OF THE INVENTION

This invention relates to image processing and more particularly to encoding of images for the efficient transmission and/or storage of high quality image information.

BACKGROUND OF THE INVENTION

Image Coding

The demand for electronic services related to pictorial images or other two-dimensional data has grown so rapidly that even the accelerating advance of electronic transmission and storage technologies will not be able to keep pace, unless the electronic data derived from the images can be compressed in a way that does not impair perception of the reconstructed image or other two-dimensional data.

Different compression methods have evolved in the art as understanding of pictorial data has increased and theoretical advances have been made. Differential Pulse Code Modulation (DPCM) and bit-plane coding were among the early methods used, and they achieved compression factors of up to 4–6 by trading image quality for lower bit rate. Pictures with higher quality than obtainable with DPCM, coded with only one bit per pixel, can now be obtained with a number of methods, such as the Adaptive Discrete Cosine Transform (ADCT) described by W. H. Chen and C. H. Smith, in Adaptive Coding of Monochrome and Color Images, Vol. COM-25, *IEEE Trans. Comm.*, 1285–92 (Nov. 1987). In an ADCT coding system, the image is decomposed into blocks, generally eight by eight, and for each of the blocks a DCT (Discrete Cosine Transform) is carried out. The compression is obtained by quantization of the DCT coefficients with variable thresholds, partially optimized for the human visual acumen, followed by variable word length encoding.

Sub-band coding of images has been introduced to picture coding. One arrangement was proposed by J. W. Woods and S. D. O'Neil, in Sub-Band Coding of Images, Vol. 34 No. 5, *IEEE ASSP*, 1278–88 (Oct. 1986). The arrangement proposed by Woods et al. includes a filter bank that divides the image signal into bands of different frequency contents. The signal of each filter output is compressed via DPCM. The compressed signals are then transmitted to a receiver where the process is reversed, and combined with the other filtered signals to recover the original image.

H. Gharavi and A. Tabatabai in Sub-Band Coding of Images Using Two-Dimensional Quadrature Mirror Filtering, Vol. 707, *Proc. SPIE*, 51–61 (Sept. 1986) use long complex quadrature mirror filters to obtain a number of frequency band signals. The "low—low" band is DPCM coded using a two-dimensional DPCM codec. A dead-zone quantizer is used for the other bands, followed by PCM coding.

Other sub-band coding schemes such as that proposed by P. H. Westerink, J. W. Woods and D. E. Boekee in *Proc. of Seventh Benelux Information Theory Symposium* 143–50 (1986), apply vector-quantization techniques to code the filter bank outputs.

In the co-pending patent application of H. Bheda and A. Ligtenberg, Ser. No. 222,987, filed Jul. 22, 1988, and assigned to the assignee hereof, the data redundancies in the different sub-band signals are employed to achieve additional data compression. In fact, that technique provides an excellent "front end" for image processing based on sub-band analysis techniques.

There remains the problem of quantizing the analyzed information more effectively in terms of bits per pixel and perceived quality of a reconstructed image. We have determined that the existing versions of the Discrete Cosine Transform do not take full advantage of all facets of the known properties of human visual perception.

Some recent work has addressed this problem. See the article by King N. Ngan et al., Cosine Transform Coding Incorporating Human Visual System Model, *SPIE Vol. 707, Visual Communications and Image Processing*, 165–71 (1986), particularly addressing contrast sensitivity. The contrast sensitivity is applied to the quantization process in a very restricted fashion; and other relevant parameters are not applied. Indeed, a kind of pre-emphasis is applied before quantization, apparently in preference to a more precise degree of control over the quantization process.

Image Halftoning

Digital Halftoning, sometimes referred to as "spatial dithering", is the process of creating a binary approximation to a sampled gray scale image. See for example, R. Ulichney, *Digital Halftoning*, MIT Press, 1987. Sampled gray scale values are typically quantized to have one of a discrete number of values, e.g., 256 or 1024 values. The basic idea in digital halftoning is to replace these quantized picture elements (pixels) from a region of the gray-scale image having an average value of x (where 0=white and 1=black) with a binary pattern of 1s and 0s. In accordance with one halftoning technique, the fraction of resulting 1s is approximately x. The binary pattern is then conveniently used with a display device such as a CRT display or a printer to produce the values for the pixels in the gray-scale halftone image. If the 1s and 0s are supplied to a printer where the 1s are printed as black spots and the 0s are left as white spaces, and if the spots and spaces are sufficiently close together, the eye averages the black spots and white spaces to perceive, approximately, gray level x. In so perceiving the image the eye exhibits a low-pass filtering characteristic. The number of gray-scale samples (pixels) is advantageously equal to the number of bits in the binary pattern.

Recent years have witnessed increasing demand for digital storage and transmission of gray-scale images. In part, this is due to the increasing use of laser printers having a resolution of, e.g., 300 spots dots) per inch, to produce halftone approximations to gray-scale images such as photographs, art work, design renderings, magazine layouts, etc. The conventional approach to achieving high quality halftone images is to use a high resolution printer. However, it can be shown that the printer resolution required for transparent halftoning with prior art techniques is of the order of 1400 dots/inch. Such printers are often slow and expensive.

Many prior art halftoning techniques assume that the black area of a printed binary pattern is proportional to the fraction of ones in the pattern. This means that the area occupied by each black dot is roughly the same as the area occupied by each white dot. Thus, the "ideal" shape for the black spots produced by a printer (in response to 1's) would be T×T squares, where T is the spacing between the centers of possible printer spots. However, most practical printers produce approximately circular spots. It is clear, therefore, that the radius of the dots must be at least T/√2 so that an all-ones binary pattern is capable of blackening a page entirely. This has the unfortunate consequence of making black spots cover portions of adjacent spaces, causing the perceived gray level to be darker than the fraction of ones. Moreover, most printers produce black spots that are larger than the minimal size (this is sometimes called "ink spreading,"), which further distorts the perceived gray level. The most commonly used digital halftoning techniques (for printing protect against such ink spreading by clustering black spots so the percentage effect on perceived gray level is reduced. Unfortunately, such clustering, constrains the spatial resolution (sharpness of edges) of the perceived images and increases the low-frequency artifacts. There is a tradeoff between the number of perceived gray levels and the visibility of low-frequency artifacts.

Other distortions that can occur in commonly used laser printers, such as the Hewlett-Packard line of laser printers, include the peculiar characteristic that a white line surrounded by several black lines appears brighter than when surrounded by two single lines. These cause further distortions to the perceived gray levels.

Block replacement is one commonly used halftoning technique used to improve perceived and gray-scale images. Using this technique, the image is subdivided into blocks (e.g. 6×6 pixels) and each block is "replaced" by one of a predetermined set of binary patterns (having the same dimensions as the image blocks). Binary patterns corresponding to the entire image are then supplied to a printer or other display device. Typically, the binary patterns in the set have differing numbers of ones, and the pattern whose fraction of ones best matches the gray level of the image block is selected. This block replacement technique is also 20 referred to as pulse-surface-area modulations. See the Ulichney reference, supra. at pg. 77.

In another halftoning technique known as screening, the gray scale array is compared, pixel by pixel, to an array of thresholds. A black dot is placed wherever the image gray level is greater than the corresponding threshold. In the so called random dither variation of this technique, the thresholds are randomly generated. In another variation, ordered dither, the thresholds are periodic. More specifically, the threshold array is generated by periodically replicating a matrix (e.g., 6×6) of threshold values.

A technique known as error diffusion is used in non-printer halftone display contexts to provide halftoning when ink spreading and other distortions common to printers are not present. See, for example, R. W. Floyd and L. Steinberg, "An Adaptive Algorithm for Spatial Grey Scale," Proc. SID, Vol. 17/2, pp. 75–77, 1976.

Like most of the known halftoning schemes, error diffusion makes implicit use of the eye model. It shapes the noise, i.e. , the difference between the gray-scale image and the halftone image, so that it is not visible by the eye. The error diffusion technique produces noise with most of the noise-energy concentrated in the high frequencies, i.e. , so-called blue noise. Thus, it minimizes the low-frequency artifacts. However, since error diffusion does not make explicit use of the eye model, it is not easy to adjust when the eye filter changes, for example with printer resolution, or viewer distance. Error diffusion accomplishes good resolution by spreading the dots. It is thus very sensitive to ink-spreading, in contrast to the clustered dot schemes like "classical" screening. In the presence of ink spreading, error diffusion often produces very dark images, therefore limiting its application to cases with no ink-spreading.

Model-based halftoning approaches have been described generally in the context of printed images. For example, Anastassiou in the paper, "Error Diffusion coding for A/D Conversion,", IEEE Trans. Cir. Sys., Vol. CAS-36, No. 9, pp. 1175–1186, September 1989 proposes a "frequency weighted squared error criterion" which minimizes the squared error between the eye-filtered binary and the eye-filtered original gray-scale image. He considers the problem intractable and suggests an approximate approach based on neural networks. Moreover, the disclosed techniques assume perfect printing, i.e. , printing without distortion. Allebach, in the paper "Visual Model-Based Algorithms for Halftoning Images," Proc. SPIE, Vol. 310, Image Quality, pp. 151–158, 1981, proposes a visual model to obtain a distortion measure that can be minimized, but provides no complete approach to achieve halftoning.

Roetling and Holladay, in the paper "Tone Reproduction and Screen Design for Pictorial Electrographic Printing," Journal of Appl. Phot. Eng., Vol. 15, No. 4, pp. 179–182, 1979, propose an ink-spreading printer model, of the same general type used in the present invention, but uses it only to modify ordered dither so that it results in a uniform gray scale. Since ordered dither produces a fixed number of apparent gray levels, this technique cannot exploit ink spreading to generate more gray levels.

SUMMARY OF THE INVENTION

The present invention provides a technique for coding an image to be halftoned. The image is encoded without introducing noise which exceeds a determined level of noise. The level of noise is determined based on an analysis of human visual sensitivity to noise in halftone images and an analysis of signals representing the image to be coded.

According to an illustrative embodiment of our invention, a sub-band analysis method for electronic image processing includes determining the amount of quantizing noise which would be just imperceptible in respect to one or more of the parameters of frequency, contrast and texture, and adapting the quantization of each pixel in response to such one or more parameters so that the amount of quantizing noise is relatively near, but below, the limit of perceptibility. By thus allowing the amount of quantizing noise to rise when it is imperceptible, we are able to achieve unprecedented data compression of a transmitted or stored image without perceptible degradation in the reconstruction thereof.

An illustrative embodiment of the present invention concerns a method for transmitting two-dimensional information, such as an image for printing.

BRIEF DESCRIPTION OF THE DRAWINGS

FIG. 24 presents a further illustrative embodiment of the present invention.

FIG. 25 presents an illustrative halftoner for use with the embodiment presented in FIG. 24.

FIG. 26 presents one period from an array of periodic thresholds used in 8×8 classical halftone screening.

DETAILED DESCRIPTION

Perceptually-Adapted Image Coding

Figure 1:
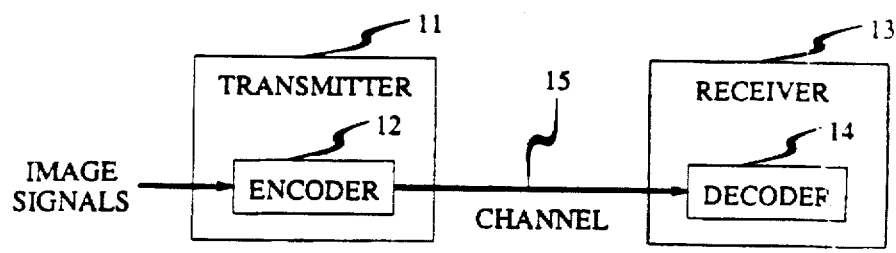
FIG. 1 is a block-diagrammatic showing of a generic organization of an image coding technique of the type to which our invention is directed.

FIG. 1 illustrates the basic communication system for practicing our invention. It includes a transmitter 11 including an encoder 12 connected, via a transmission channel 15, to a receiver 13 including a decoder 14. Transmission channel 15 should be considered in its broadest sense to include a storage medium, such as a compact disk read-only memory (CD ROM) or digital tape medium. That is, rather than sending encoded signals to a receiver in "real time," one can store the signals in such a "channel" and reproduce them at a latter time upon request. This concept encompasses, of course, situations that are not usually thought of as communicating, the channel or "medium" being a purchased recording and the transmitter and receiver serving recording and reproduction functions of interest to a consumer, even for use in his home. Another major application includes archival of major collections of photographs, as in geological surveying. The "channel" 15 is then the archive.

Figure 2:
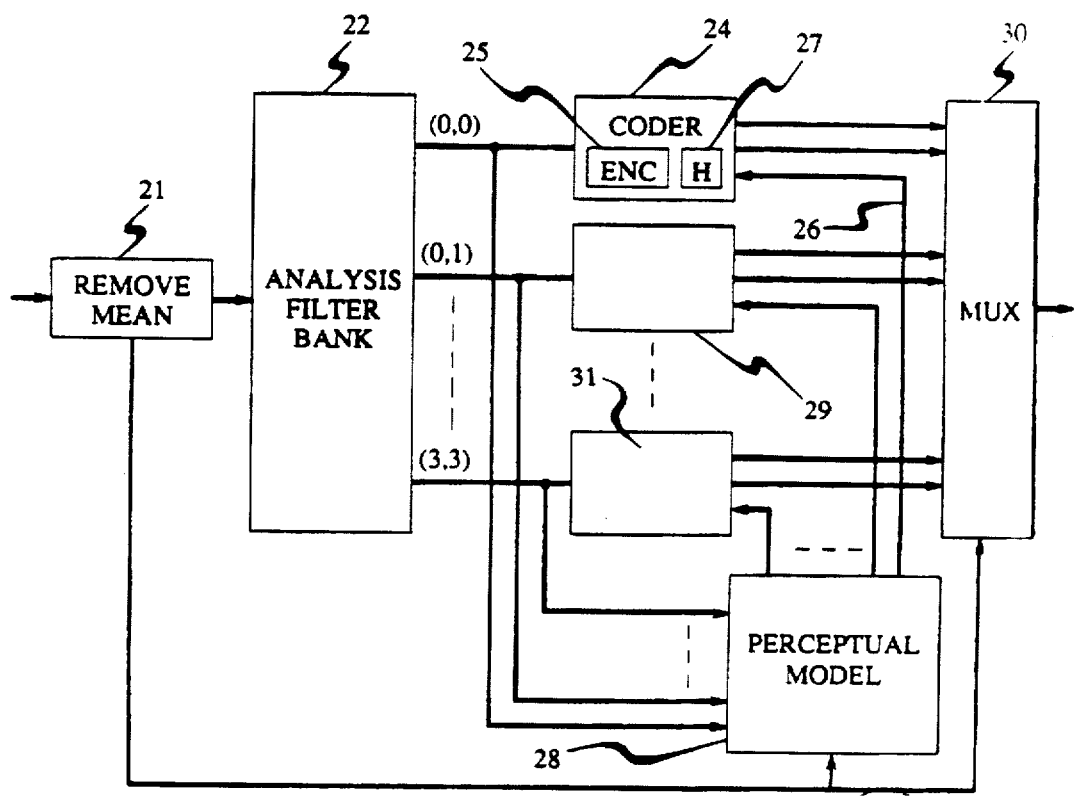
FIG. 2 depicts a block diagram of encoder 12 of FIG. 1, adapted according to our invention.

FIG. 2 depicts a block diagram of encoder 12. It includes an analysis filter bank 22 to which the image signal is applied. The image signal can have any number of formats, and the standard raster format for two dimensional images is an acceptable one. For digital filtering, the signal already has been pre-sampled Coy means not shown). In addition, the signal mean value has been removed by processor 21. It is quantized to 8 bits and presented to the Perceptual Model (28) and the multiplexer (30). In FIG. 2, filter bank 22 has 16 outputs, from (0, 0) to (3, 3), but it is understood that this can be any number greater than 1. These correspond to the 16 possible signals of an image that was filtered into a high band and a low band and two intermediate bands in both the horizontal dimension and the vertical dimension. The respective four bands of developed image data in the horizontal dimension, for example, are then passed through the corresponding "vertical filters". The reorganization of the data implied here is simply done when the data is in the sampled data format. For most scenic images, as contrasted with images comprising merely lines, the lowest band image (low pass filtered both horizontally and vertically) contains the bulk of the relevant visual information, while the other bands contain detail information.

Utilizing the above, FIG. 2 includes a coder 24 that is responsive to the lowest band (0,0) image for both directions. The quantizer-encoder apparatus 25 in coder 24 responds to the human visual system adaptation signal on lead 26 to render the quantizing and encoding process responsive to the perceptual analysis occurring in perceptual model 28. In coder 24, the quantizer-encoder 25 is followed by a Huffman encoder 27 to prepare the signal for multiplexer 30. One of the inputs to model 28 is derived from processor 21 in order to provide one datum for each 30 pixel related to contrast and brightness.

The other inputs to perceptual model 28 are exactly the inputs to coder 24 and the other 15 similar coders.

The other coders responding to other frequency bands, e.g., coder 29 and coder 31, are organized similarly to the organization of coder 24.

In our system, as contrasted to that of the above-cited co-pending patent application of Bheda et al., the compression of the data achieved, for example, in coder 24, is a direct consequence of the principles of our invention, which will now be described.

One possible implementation of the filter bank (22) would utilize an equal bandwidth filterbank using separable Generalized Quadrature Mirror Filters (GQMF), as described in the article by R. V. Cox, "The Design of Uniformly and Nonuniformly Spaced Pseudo Quadrature Mirror Filters," Vol. ASSP-34, No. 5, *IEEE Trans. ASSP,* 1090–96 (Oct.

Figure 3:
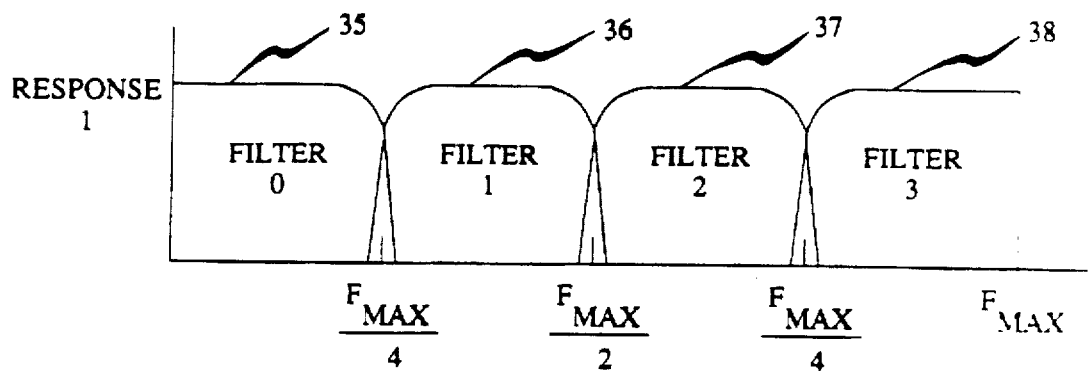
FIG. 3 shows curves of the characteristics of filters usable for each stage of filtering in the analysis filter bank of FIG. 2.

1986). A separable two dimensional filter consists of two one dimensional filters applied in orthogonal directions. In our case, a GQMF filter is applied first to the rows of an image, providing horizontal filtering as illustrated by filters 40-43 of FIG. 4, then the same filter is applied to the columns of the horizontally filtered images to provide the vertical filtering. Typical filter characteristics are shown in curves 35-38 of FIG. 3.

The output of filters 40-43 can be down-sampled (sometimes called "subsampled"); and, to that end, down-sampling switches 45-48 are to be responsive to filters 40-43, respectively. Down-sampling can be accomplished, for example, by ignoring three out of every four samples (while, on the other hand, up-sampling would be accomplished by repeating a given sample). The outputs of down-sampling switches 45-48 are applied to transpose memories 50-53, respectively, that transpose the pixel signals of the two-dimensional image in the manner of transposing matrices. Transpose memories 50-53 are conventional memories in which signals are stored in one way (following rows) but accessed in a different way (following columns). Such memory arrangements are well known in the art. For the sake of completeness, however, the following simple implementation is suggested. To obtain transposition, one may use an address counter and a memory responsive thereto, with a logic circuit interposed therebetween. The logic circuit allows for interchange 25 of a number of least significant bits of the counter with higher significant bits of the counter. A normal sequence is thus obtained without the interchange of bits; and the transposed sequence is obtained by interchanging the bits.

The output of transpose memory 50 is applied to filters 55-58, and similarly the outputs of transpose memories 51-53 are respectively applied to sets of filters 60-63, 65-68, (not shown) and 70-73. These sets of filters, for example, 55-58, are exactly like filters 40-43, in the same order and, in fact, may be implemented on a time-shared basis by the same set of digital filters. The outputs of filters 55-73 are applied to down-sampling switches 75-93, respectively (each numbered 20 digits higher than its corresponding filter), which produces the outputs of analysis filter bank 22. The GQMF filters we used split both the horizontal and vertical dimensions into four equal width bands. This number of bands provides a convenient tradeoff between spatial and frequency localization, as fewer bands would provide too coarse frequency analysis, while more bands would blur spatial localization.

The lowest frequency in both dimensions is in sub-band (0,0), while the highest frequencies in both dimensions are in band (3,3). The GQMF filter that was used in our system has a first sidelobe suppression of >48 dB, which ensures perfect reconstruction of an 8 bit/pixel image.

The perceptual masking model (28) provides an estimate of the amount of coding distortion that may be added to each pixel in each sub-band signal so that there will be no discernible difference between the original image and the coded version. This model utilizes several well known properties of the human visual system (HVS) in unique ways. The properties we use are: frequency response; contrast sensitivity; and texture masking. This model is not meant to be a complete description of the HVS, but it provides an approximation of the effects major HVS properties have on the perception of an image given a particular analysis/synthesis procedure.

The frequency response component (102) provides the maximum amount of distortion that can be added to each of the sub-band signals given a midgray flat-field image as input. The HVS is most sensitive to noise is this type of stimulus. The other components of the model adjust this distortion estimate for deviations in the image's brightness from midgray (block 103), and for its deviations from flat-field (block 101). These estimates are then combined (block 104), and presented as input to each of the sub-band encoders (24).

The base sensitivity estimates were derived from a set of psychophysical experiments. A uniform mid-gray image was presented to the analysis filter bank (22). For one of the resulting sub-band signals, say (0,0), white, uniform random noise was added. This distorted signal, along with the other 15 undistorted signals were presented to the reconstruction filter bank (150). This distorted image, and the original were viewed side by side in a darkened room at a viewing distance of 6 times image height. The variance of the added white noise was adjusted to find the maximum value for which a human observer could perceive no difference between the original and distorted images. This process was then repeated for each sub-band signal in turn. Typical RMS noise sensitivity values for this experiment are presented in FIG. 8. These values were experimentally derived and are dependent on the particular filters used in the analysis filter bank, and the viewing distance, therefore some lo variation in these values should be expected.

Figures 8, 9:
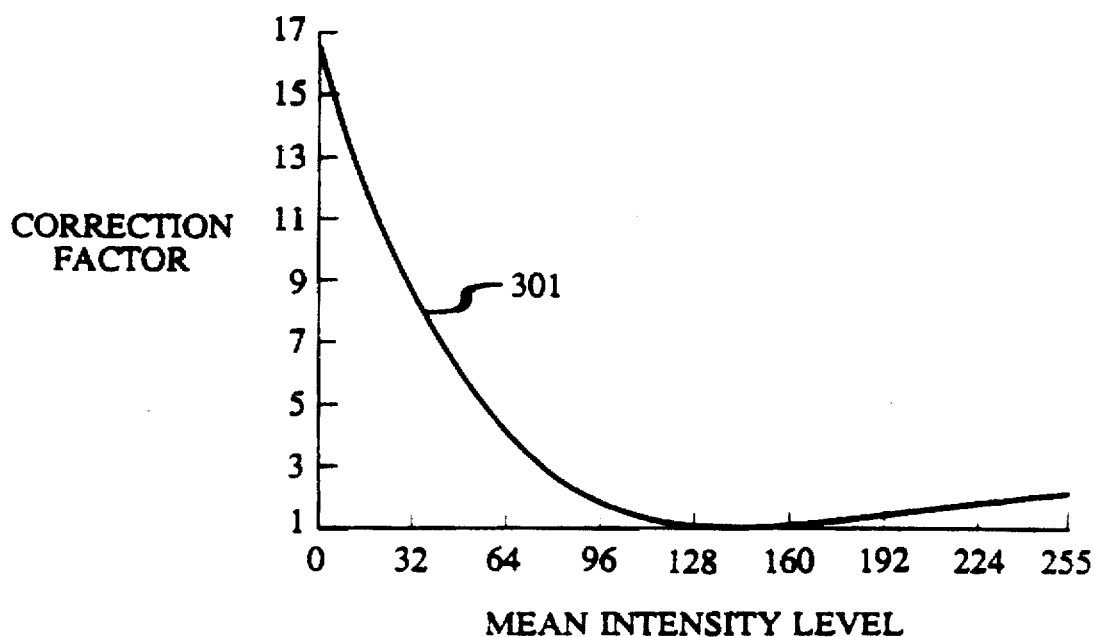
FIG. 8 shows a table useful in explaining the invention.
FIG. 9 shows a curve useful in explaining the invention.

These values provide the allowable coding distortion for one particular stimulus, namely a mid-gray flat field. The brightness adjustment term is used to generalize this model to flat-field stimuli with varying brightness. The previous experiment was repeated for sub-band (0,0), but the gay level of the flat field input was now varied from pure back to pure white. Again, the maximum amount of white noise that could be added to the stimulus was determined. The resulting deviations from the sensitivity values for mid-gay flat field are shown in FIG. 9. The correction factor is applied by computing the local image mean, looking up the value of the correction factor in FIG. 9, and multiplying the base sensitivity for the sub-band by that value. For the conditions of the base sensitivity experiment (gray level of 127), it provides no adjustment, but for higher and lower gray levels, it allows for substantially more coding distortion. A full implementation of this correction term would repeat this series of experiments for each sub-band, resulting in 16 correction curves. However, it was determined that the shape of this curve is essentially constant across relevant sub-bands, so an efficient implementation uses this one curve for every sub-band. The final component of the perceptual metric provides an adjustment for the decreased noise visibility given non-flat-field inputs, i.e. texture. Flat-field stimuli have only DC frequency components, while textured input has both DC and AC components. The noise visibility for the DC component is accounted for by the base sensitivity and brightness adjustment terms, while the texture masking term (101) handles the AC terms. This texture masking term consists of a weighted sum of the AC portion of the energy in each sub-band. Since the HVS has a non-uniform transfer function, the energy in each sub-band is weighted by the relative visibility of the frequencies contained in each sub-band.

In practice, a value for the perceptual metric is determined at every point in every sub-band. One possible implementation could use table look-up indexed by sub-band number to determine the base sensitivities, and table look-up indexed by the sum of the overall image mean and the local value from each point in sub-band (0,0) to determine the Brightness Adjustment. The texture masking term could be computed by taking the variance over a 2×2 pixel block in sub-band (0,0). (This computes the AC energy in the lowest frequency sub-band) weighted by the average HVS response in band (0,0). For each of the other sub-bands, added to this term would be the average energy over a 2×2 pixel block weighted by the average HVS response for that sub-band. This composite term would then be raised to the power 0.065. This number was set to ensure that highly textured images would be transparently coded. Each of these terms are input to the combination block (104) where they are multiplied together to produce the final value for the perceptual metric. This procedure will provide a metric that will produce visually transparent coding. If some perceptible distortion is allowable, this metric could be relaxed multiplying it by a constant >1.0.

The perceptual metric is then used to control a DPCM encoder (25) (FIG. 2) for each sub-band. DPCM coding is well known in the prior art. The predictor block (108) uses a three point predictor utilizing the previous point, previous row, and back diagonal, is used. The optimal predictor coefficients are computed for each sub-band and quantized to 5 bit accuracy. If a portion of the subband is coded, these coefficients are sent as side information to the decoder.

A uniform quantizer is used (106). Its step size is determined by the perceptual metric function (28 in FIG. 2). If the absolute value of the difference between the original and coded signals is less than the value of the metric, the coded image will be visually indistinguishable from the original. One means of satisfying this condition is to set the quantizer step size to twice the minimum value of the perceptual metric over a sub-band in quantizer stepsize calculator 107. This step size is quantized to 16 bit accuracy and sent as side information to the decoder. The summation function 105 operates on the sub-band image signal and the output of predictor 108 to provide the input to the uniform quantizer 107. The output of the quantizer, hereafter called code words, denoted $c(x,y,i,j)$ where x and y are the spatial location with a sub-band, and i and j are the sub-band number, are passed to the Huffman encoder (27).

Noiseless Compression

First, inside of each sub-band, the codewords $c(x,y,i,j)$, are partitioned into 4×4 partitions. For the purpose of discussing the noiseless compression, we will assume that the original image is 512×512 pixels, ergo each sub-band is 128×128. There are 32×32 partitions, each containing 4×4 codewords, in the 128×128 sub-band image. The number 512×512 is chosen for the purpose of illustration, other sizes of original and/or sub-band image may be compressed via this compression algorithm. Since the noiseless compression works identically in each sub-band, the notation indicating sub-band, i,j will usually be omitted. The variables used in this section will be k, l,0≤k, l<32, which are the indices for the partitions. First, for each partition, the largest absolute value, LAV, contained in each partition is calculated, i.e., LAV(k,l)=max (abs(c(x,y,i,j))), 4k≤x<4 (k+l), 4l≤y<4(l+ l), where c (*) is the DPCM codewords for the proper sub-band from the process above.

After the LAV(*) are calculated, the number of non-zero LAV(k,l) are counted. If there are no non-zero LAV's, the sub-band has no coded data to send, and a zero bit is sent, indicating that "this band is not coded". If there are non-zero LAV's, a "1" bit is sent. If there are non-zero LAV's, but fewer than roughly 150, the k,l addresses of each are sent, at a cost of 5 bits per k or l, along with a 9 bit count indicating how many coded partitions there are. These k,l pairs are used to indicate which blocks will have their c(*) encoded if there are a large number of non-zero partitions, a "Dimensionality Map" is calculated and sent for the entire sub-band.

Calculating the Dimensionality Code

Regardless of the number of non-zero partitions, a short Huffman code is calculated from the LAV distribution, based on a 4-way partition of the LAV's in the case of many nonzero partitions, or a three-way partition in the case of a few non-zero partitions. This code is used to generate a "Dimensionality Map" that can be used at the transmitter and efficiently transmitted to the receiver. For the 4-way case, the number of $N_z$=number of zero LAV'S, $N_{4d}$= number of 0<LAV≤3, $N_{2d}$=number of 3<LAV≤25, and $N_{1d}$=number of 25<LAV are calculated, and for the 3-way case, $N_z$ is omitted. This 2 to 4 element code is transmitted at a cost of 8–30 bits, depending on the data, to the receiver. Symbols with zero occurrences are not included in the codebook.

Calculating the Dimensionality Map

A dimensionality map is then transmitted to the receiver, using the code calculated above, where one of the four symbols z, 4d, 2d, or 1d is sent for each partition in the case of many non-zero partitions, or one of three 4d, 2d or 1d, is sent in the case of few non-zero partitions. The number 150 that is used to determine "many" vs. "few" is selected because it is the average crossover point between k,l addressing cost and transmission of the entire This "Dimensionality Map" is used to determine the way that the c(*) are encoded, both at the transmitter and receiver. In the case of few non-zero partitions, the "Dimensionality Map" is called the "Reduced Dimensionality Map", as the location of the non-zero partitions is explicitly transmitted, rather than determined implicitly from the position in the dimensionality map.

Transmitting the Codewords

The codewords, c(*), are transmitted last in the noiseless compression sequence. One of three encoding methods is used for each partition in which the LAV is non-zero, depending on the entry in the dimensionality map in for that partition. In cases where the LAV for the partition is known to be zero, either by omission in the reduced dimensionality map, or explicitly in the dimensionality map, the c(*)'s are not transmitted.

1d Coding

The 1d coding is a one-dimensional Huffman coding of the 16 c(*)'s in the partition, and is used when the 1d symbol appears in the dimensionality map. Each c(*) is separately encoded using a selected pre-generated Huffman codebook. The codebook selection (one of six) for each entire sub-band for 1d coding is made on the basis of which of the 6 1d codebooks provides the best compression. The information on codebook selection for 1d, 2d, and 4d are all transmitted after the dimensionality map, but before any of the c(*) date is transmitted.

2d Coding

The 2d coding is done on the partitions that have a 2d symbol in the dimensionality map. For these partitions are encoded as 8 pairs of 2 c (*)'s, using adjacent horizontal pairs to find an entry in one of six 2-dimensional Huffman codebooks. Again the best 2d codebook is selected on a sub-band by sub-band basis, and the codebook selection is passed to the receiver as above.

4d Coding

The 4d coding is done on the partitions that have a 4d symbol in the dimensionality map. For these partitions, the c(*)'s are encoded as 4 groups of 4 elements each. Each of the 2×2 sub-squares of the partition is encoded as one codeword in a 4 dimensional Huffman codebook. The codebook selection is done as above.

Compression Results

The compression results from the above methods have the following properties: Totally vacant (in the perceptual sense) sub-bands are encoded using 1 bit, or a rate of 1/16384 bits/pixel (16384=$128^2$). In sub-bands where only a few perceptually significant partitions exist, each is encoded with 10 bits for the location, approximately 2 bits for dimensionality, and a small number of bits for the c (*)'s. This allows for efficient encoding of a small part of any given sub-band where that part is perceptually important. In bands where more than ⅛ of the band is encoded, all partitions are encoded, but: All-zero partitions are encoded at a rate of 1/16 bits/pixel, if all-zero partitions are common. Parts of the sub-band that have a very few non-zero, or all small values, are encoded with a 4 dimension codebook that provides a minimum of ¼ bits/pixel for all-zero sub-partitions. In addition, any residual correlation spread over the 2×2 squares is efficiently encoded. Parts of the sub-band with moderate activity are encoded at a minimum rate of ½ bits/pixel, and the residual correlation also taken care of by the codebook. Parts of the sub-band with very high activity are encoded with a coding method that has a minimum rate of 1 bit/pixel, but that also allows for maximum values as they may be required by the perceptual process, without requiring the use of $\log_2$ (abs($2c_{max}$)*2+1) bits for each element. The use of 6 codebooks for each dimensionality allows the coder to choose from a variety of probability/ correlation combinations. While this result does not greatly increase the compression rate, on the average, it does greatly increase the effectiveness of the compression algorithm on the most difficult items. The use of a short (4 element) internally generated Huffman code for the dimensionality map allows effective and efficient transmission of the dimensionality map. As an example, in many higher sub-bands the only symbols needed are z and 4d. Given the locally calculated and easily transmitted codebook, for that case only 1 bit/map element is used, making the "side-information" cost only 1/16 bits/pixel.

Codebook Generation

This section describes the method we use to generate the codebook set for the Huffman compression of the c(*)'s. There are three sets (4d, 2d, and 1d ) of six codebooks that must be predetermined.

The Huffman codebooks are generated from the probability distribution of the data that they encode, so the task is that of partitioning the data into 6 sets based on their statistics such that the Huffman codes are efficient. We do this in several steps: First, we partition the appropriate data (4d,2d, or 1d ) into six sets, via the Modified K-Means algorithm and the total frequency content, or on an image by image basis. Using the distribution for each set, we generate a Huffman codebook. Using that set of codebooks, we encode the entire training set, at each sub-band selecting the best of the six codebooks for each dimensionality, and saving, the number of occurrences in each codebook slot for the selected codebook. Using the new set of distributions, generate a new Huffman codebook set. Repeat the process of the last two sentences until the exchange of sub-bands between codebooks becomes infrequent.

These steps are based on the following: Each time a different codebook selection is made, a new and better encoding has been selected. If a codebook change is not made, the average rate remains the same. Each time a new codebook is calculated, it fits the data that it is applied to better, and provides the same or better compression because it is calculated to fit the current, rather than the last iteration's data.

This codebook selection procedure is run on a training set of 107 images.

Codebook Effectiveness

The codebooks selected and trained on our training set have been tested on a 36 element set of test images that are different than the training images. The performance of the compression algorithm, including the codebooks, on the test images is equivalent to the performance on the training set.

We have imposed various mismatches deliberately, such as changing the quality offset Coy ±5 or ±10 dB), while using the codebook for zero offset. The compression results, while not as good as is possible for a properly generated codebook, are still close to that of the properly generated codebook for perceptual offsets within the +10 to −5 range.

There are 6*$7^4$ elements in the 4d codebook set, 6*$51^2$ in the 2d set, and 6*769 elements in the 1d set, for a total codebook size of 34626 entries. This small codebook set suffices for the range of images from simple scenery with low contrast all the way to complex text or texture images.

Our preliminary tests of the invention demonstrate the interaction of the low-pass spectrum of images and the perceptual metric work together to reduce the amount of information that needs to be coded, including a significant reduction in the average percent of time in which at least one 4×4 block of a sub-band must be coded, and in the percent of each sub-band that is coded given that at least one 4×4 block is coded. These can be interpreted by thinking of sub-band (0.0) as a reduced resolution version of the image and the rest of the sub-bands as "detail" images at increasingly finer levels. Therefore band (0.0) has the greatest amount of perceivable information about the image, while the higher frequency bands contain perceivable information only where there is a certain type of detail. Smooth low detail areas require only one sub-band (although the value of the perceptual metric may be quite small at the point), while high detail areas, such as edges, require information from several sub-bands.

Figure 7:
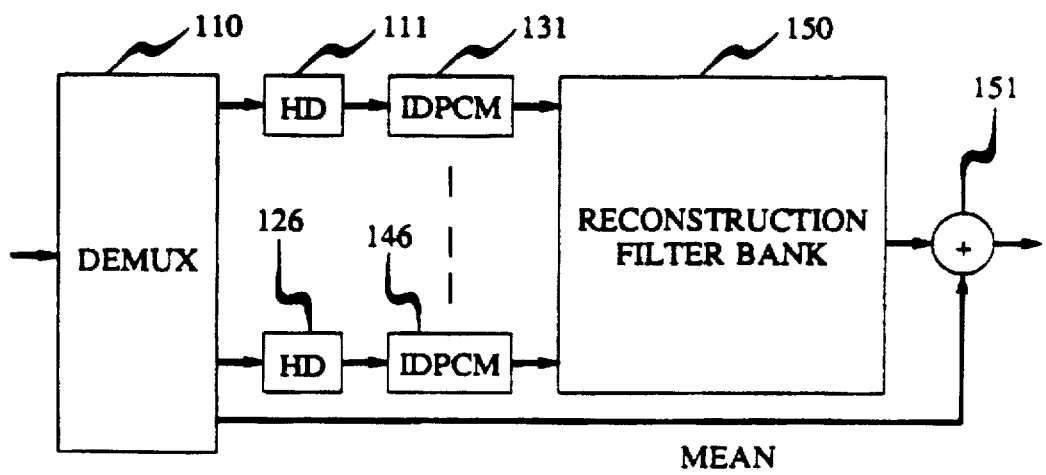
FIG. 7 is a block diagrammatic showing of one organization of the decoder 14 of FIG. 1.

In FIG. 7, there is shown the detailed implementation, according to our invention, or receiver 13 and decoder 14 of FIG. 1. The arrangement of FIG. 7 simply reverses the encoding process. The receiver-decoder of FIG. 7 includes the de-multiplexer 110, the Huffman decoders 111–126 for each of the individual 16 sub-bands, the inverse differential PCM processors (decoders) 131–146, the reconstruction filter bank 150, and the combiner circuit 151, which could be shown as a part of reconstruction filter bank 150.

Figure 4:
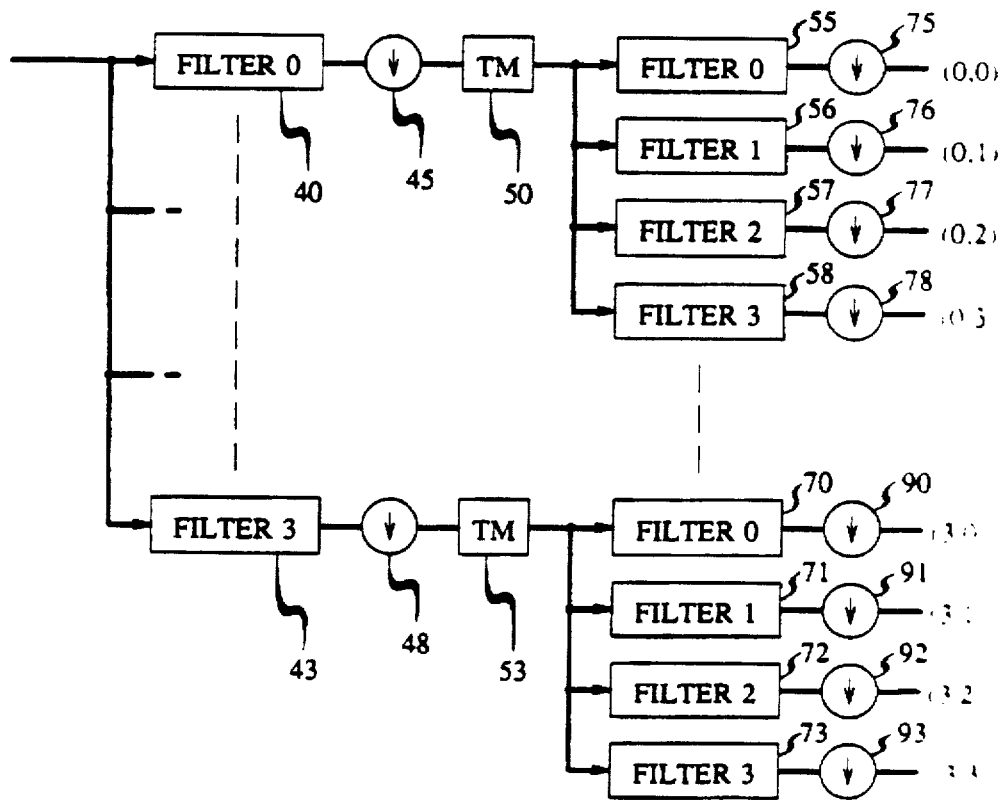
FIG. 4 is a block diagrammatic illustration of the organization of the analysis filter bank of FIG. 2.
Figure 10:
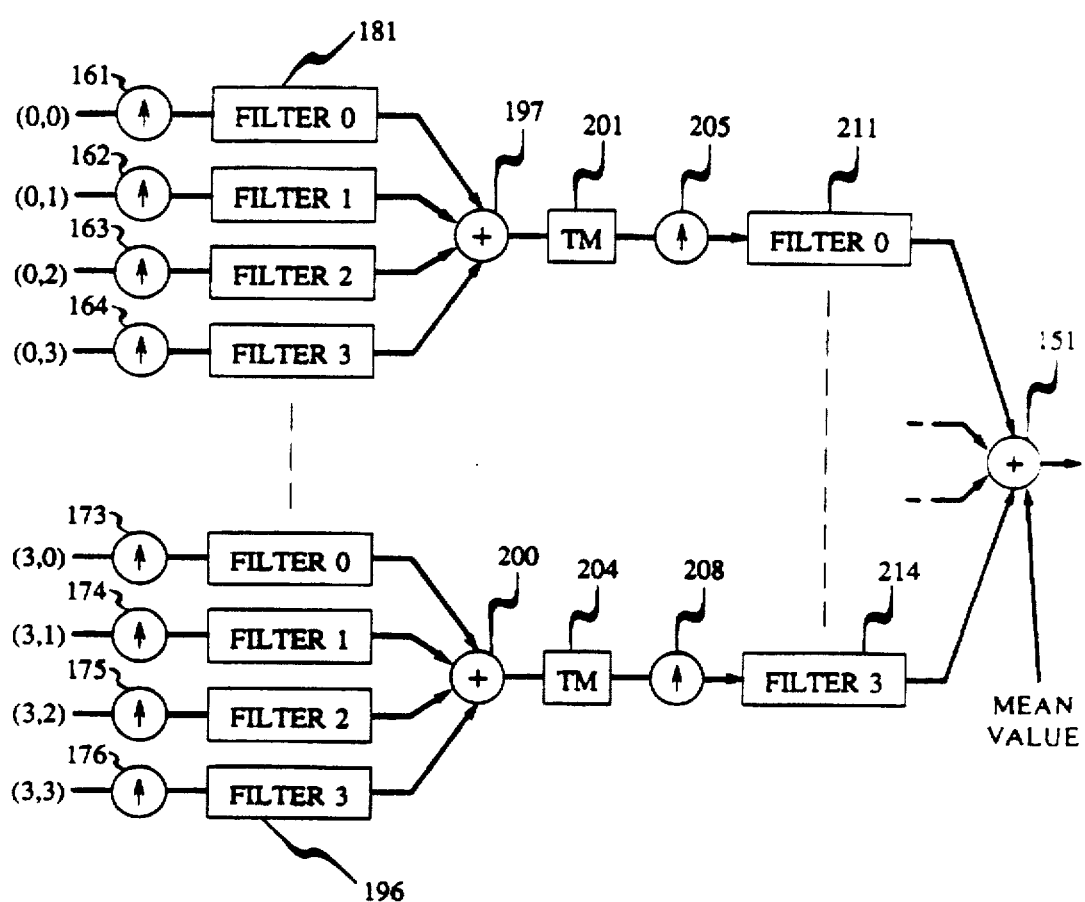
FIG. 10 shows a block diagram of the reconstruction filter bank of FIG. 7.

Reconstruction filter bank 150 is detailed in FIG. 10; and it will be seen that this figure provides the same type of apparatus, but operating to merge the 10 sub-bands, as the apparatus of FIG. 4, with up-sampling replacing down-sampling.

Figure 6:
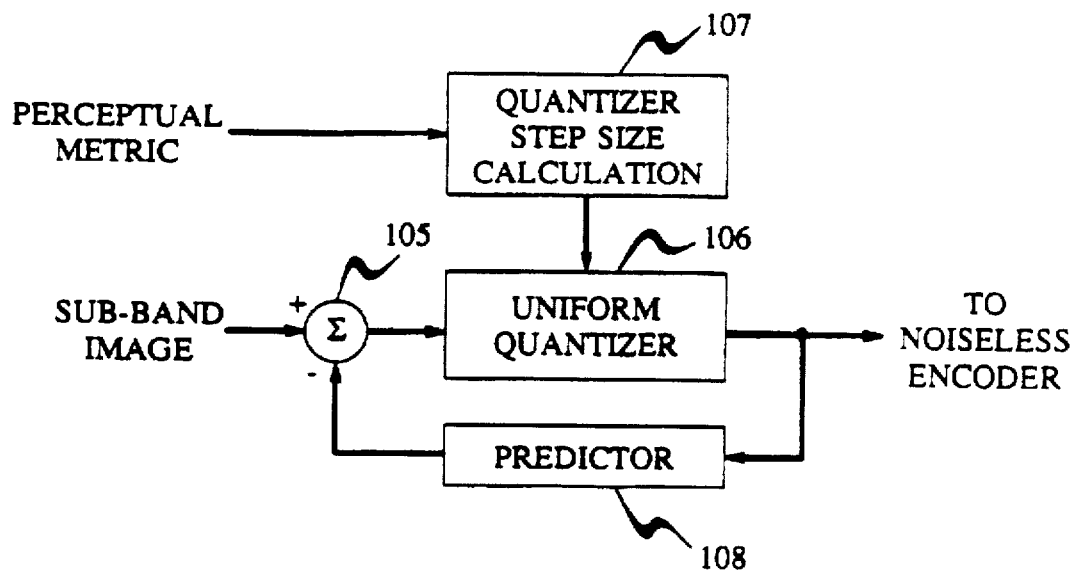
FIG. 6 is a block diagrammatic showing of the encoder 25 of FIG. 2.

Of course, the mean value that was removed in apparatus 121 of FIG. 2 was also transmitted or recorded and must be re-inserted in combiner 151 of FIGS. 6 and 7.

Specifically, each of the sub-band passes through its respective upsampling switch 161-176, where values are repeated from (4) times, through the respective of filters 181-196, through combiners 197-200, through transform memories 201-204, up-sampling switches 205-208, and filters 211-214 to combiner 151.

Finally, our tests demonstrate that the combination of multidimensional noiseless compression and the omission of coding of blocks that meet the perceptual metric provide a very powerful bit-rate reduction scheme. The linear codebook is used only for portions of the low frequency sub-bands, while the 2D and 4D codebooks, with their lower bit-rate, are used everywhere else. This scheme allows extremely fine quantization of the data where it is necessary, without the large bit-rate penalty where it is not. The reproduction of the two-dimensional information is of surprisingly good quality; and the algorithms are capable of imperceptible degradation.

It should be apparent that various modifications of the inventions are possible within the scope of the above-described principles of operation. For example, the adjustments for frequency and contrast sensitivity could be separated more completely than they are in the base sensitivity and brightness adjustment processes of FIG. 5.

Model-Based Halftoning

Models of Visual Perception

To help understand the use of printer models in accordance with the present invention, a brief introduction to some aspects of human visual perception will be presented. As mentioned above, halftoning works because the eye perceives a set of closely spaced black and white spots as a shade of gray. Alternatively, it may be said that the eye acts as if it contained a spatial low pass filter.

Figure 11:
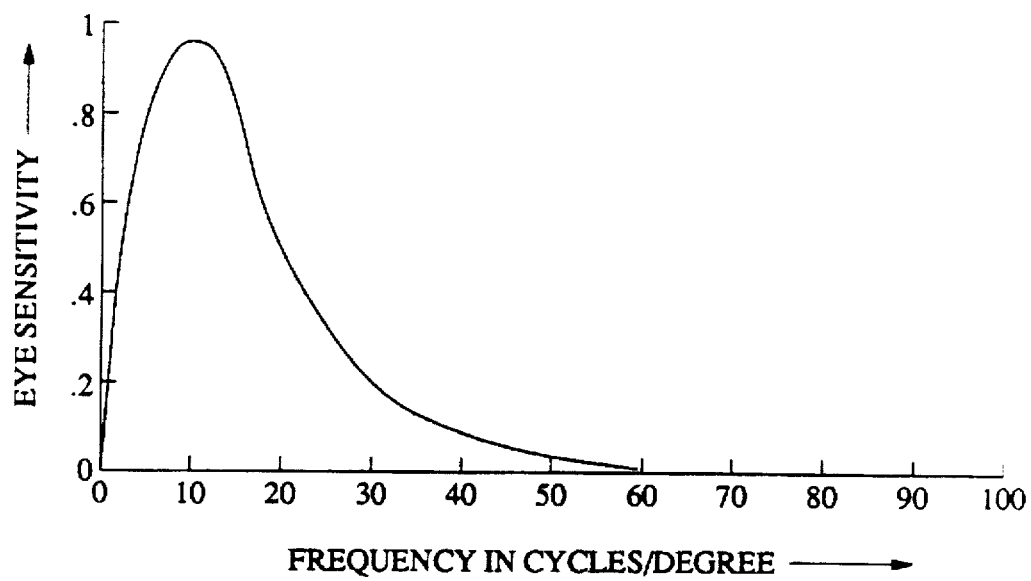
FIG. 11 shows a well-known sensitivity characteristic of the human eye.

Numerous researchers have estimated the spatial frequency sensitivity of the eye, often called the modulation transfer function (MTF). Typical of such is the following estimate for predicting the subject quality of coded images.

$$H(f)=2.6(0.0192+0.114f)\exp\{-(0.114f)^{1.1}\} \qquad (1)$$

where f is in cycles/degree. See Mannos, J. L. and D. J. Sakrison, "The Effects of a Visual Fidelity Criterion on the Encoding of Images," *IEEE Trans. on Info. Th.*, Vol. IT-20, no. 4, pp. 525-536, July 1974. This MTF band on the Mannos and Sakrison teachings is plotted in FIG. 11. As indicated by Eq. (1), the eye is most sensitive to frequencies around 8 cycles/degree. Others have variously estimated the peak sensitivity to lie between 3 and 10 cycles/degree. The decrease in sensitivity at higher frequencies is generally ascribed to the optical characteristics of the eye (e.g., pupil size). FIG. 11 shows that the sensitivity of the eye has dropped 3 db from its peak at about 3 and 16 cycles/degree, 20 db at 35 cycles/degree and about 46 db at 60 cycles/degree. The decrease in sensitivity at low frequencies accounts for the "illusion of simultaneous contrast" (a region with a certain gay level appears darker when surrounded by a lighter gray level than when surrounded by a darker) and for the Math band effect (when two regions with different gay levels meet at an edge, the eye perceives a light band on the light side of the edge and a dark band on the dark side of the edge).

The eye is more sensitive to horizontal or vertical sinusoidal patterns than to diagonal ones. Specifically, it is least sensitive to 45 degree sinusoids, with the difference being about 0.6 db at 10 cycles/degree and about 3 db at 30 cycles/degree. This is not considered to be large, but it is used to good effect in the most commonly used halftoning technique for printers as will be described more completely below.

Figure 12:
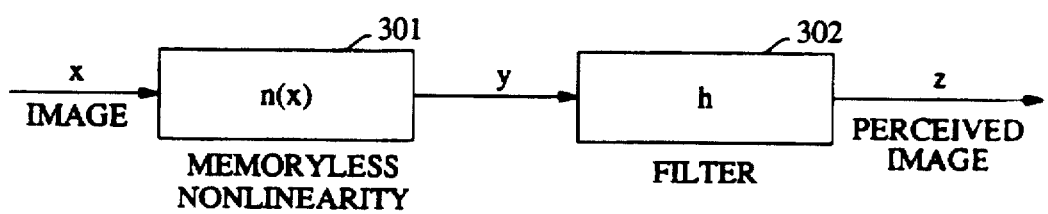
FIG. 12 shows a simple eye model based on prior art teachings.

Many models have been proposed that attempt to capture the central features of human visual perception. For example, see Jain, A. K., Fundamentals of Digital Image Processing, Prentice Hall, Englewood Cliffs, N.J. 1989, especially pp. 56-57; Cornsweek, T. N., Visual Perception, Academic Press, New York, N.Y., 1970; and Netravali, A. N., and Haskell, B. C., Digital Pictures: Representation and Compression, Plenum, New York, N.Y., 1988, especially pp. 292-297. The simplest visual perception models include just a filter, for example the filter of Eq. (1). Another, and perhaps most commonly cited include a memoryless nonlinearity, as shown in FIG. 12. There, the input image, represented by x, is shown being subjected to the memoryless nonlinearity 301 to produce a modified image, y, before being filtered by filter 302, e.g., that of Eq. (1). The output, z, of filter 302 is the perceived image. Such nonlinearities account for Weber's law, which says that the smallest noticeable change in intensity is proportional to intensity (intensity=1-gray level). Most commonly it is represented as a logarithm or power law (e.g., $1-(1-x)^{1/3}$). More complex models include, for example, a filter before the nonlinearity 301 or a bank of filters in place of 302.

Figure 13:
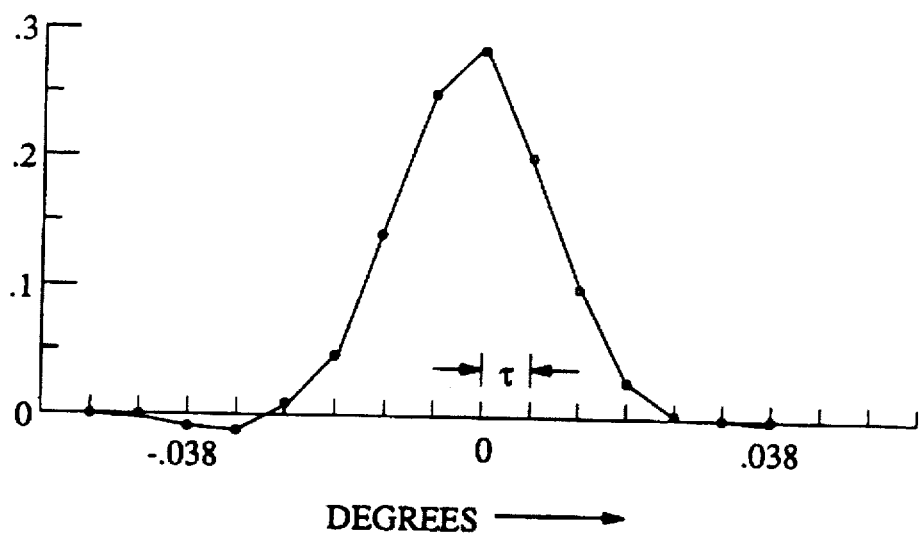
FIG. 13 shows an impulse response for a filter used in modeling human visual perception.
Figure 14:
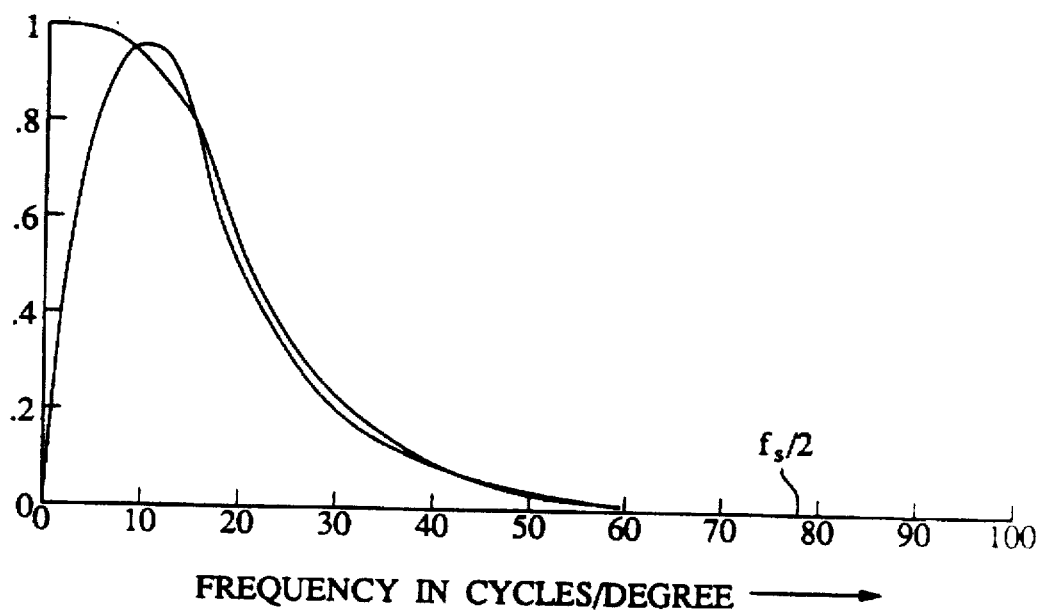
FIG. 14 shows a frequency response for the filter of FIG. 13.

In many cases, practical considerations dictate a finite impulse response (FIR) filter for modeling eye characteristics. Indeed, for certain of the least-squares halftoning techniques described below it proves advantageous to use a one dimensional discrete-space model of the form $$z_k=M(x_{k-m},\ldots,x_{k+m}), \qquad (2)$$

where the $x_k$'s are samples of the image (from one line or one column), the $z_k$'s are the model outputs (upon which cognition is based), and $M(.)$ is a sliding-window function with 2m+1 arguments (m is a non-negative integer). Such a model can easily incorporate a memoryless nonlinearity and an FIR filter. Typical models that can be used are typically of the form $$z_k=n(x_k)*h_k, \qquad (3)$$

where $n(.)$ is a memoryless nonlinearity, $h_{-m},\ldots,h_m$ is the impulse response of an FIR filter and * denotes convolution. Also appropriate in some circumstances for the nonlinearity function 301 is $$n(x)=1-(-x)^r \qquad (4)$$

for various values of r. For example, others have found $r=\frac{1}{3}$ to be best. While it is advantageous to choose m as large as possible, a value of m=7 with a 15-th order FIR filter that roughly matched (1) for samples taken at 300 dpi and viewed at 30 inches was found to involve a reasonable level of complexity for many applications. Approximations to the resulting impulse and frequency response are shown in FIGS. 13 and 14, respectively. In FIG. 14, the dotted curve shows the eye MTF of FIG. 11 for comparison; $f_s=1/\tau$ cycles/degree. The asymmetry of the impulse response in FIG. 13 is an artifact of the filter design program. In FIG. 13, x is equal to 0.0064 degrees.

Similarly, for certain of the two-dimensional least-squares halftoning techniques described below it proves advantageous to use a two-dimensional discrete-space model of the form $$z_{i,j}=M(x_{k,l}(k,l)\epsilon N_{i,j}) \quad (5)$$

where the $x_{k,l}$'s are image samples, $N_{i,j}$ is a finite neighborhood of the site (i,j), the $z_{i,j}$'s are the model outputs (upon which cognition is based), and M(.) is a sliding window function. Such a model can easily incorporate a memoryless nonlinearity followed by an FIR filter. Typical models that can be used are of the form $$z_{i,j}=n(x_{i,j}*h_{i,j}) \quad (6)$$

where n(.) is a memoryless nonlinearity (same as in the one-dimensional case), $h_{i,j}$ is the impulse response of an FIR filter, and * denotes convolution. For samples taken at 300 dpi and viewed at 30 inches, the two-dimensional filter could be given by $h_{i,j}=h_ih_j$, where $h_k$ is the one-dimensional filter of FIGS. 13 and 14. More elaborate filters could be non-separable and could account for the lower sensitivity of the eye to 45 degree sinusoids mentioned above.

Printer Models, Generally

This section will introduce a framework for printer models and some specific models for laser printers. A good model is one that accurately predicts the gray levels produced by a printer. While the teachings of the present invention may be applied to a wide variety of printer types, it proves especially advantageous to employ "write-black" laser printers having, for example, 300 dpi resolution. Typical of such printers are various ones of the family of laser printers marketed by the Hewlett-Packard company, or the Model LZR 1260 by Data Products.

To a first approximation, such printers are capable of producing black spots (more commonly called dots) on a piece of paper, at any and all sites whose coordinates are typically given in the form (iT,jT) for i=1, . . . , $N_H$ and j=1, . . . , $N_w$, where T is the horizontal and vertical spacing between dots (typically in inches), $N_H$ is the number of printable lines (rows of dots), $N_w$ is the width of a printable line in dots, and (iT, jT) are the coordinates of the jth site from the left, on the ith line from the top. (These coordinates are consistent with matrix notation rather than the usual convention for the plane.) The reciprocal of T is generally referred to as the "primer resolution" in dots per inch (dpi). The site with coordinates (iT,jT) will in the following description be called "site (i,j)". The primer is controlled by sending it an $N_h$ by $N_w$ binary array B=[$b_{i,j}$], where $b_{i,j}=1$ indicates that a black dot is to be placed at site (i,j) and $b_{i,j}=0$ indicates that the site is to remain white. The latter will be referred to as a "white" dot.

Figure 15:
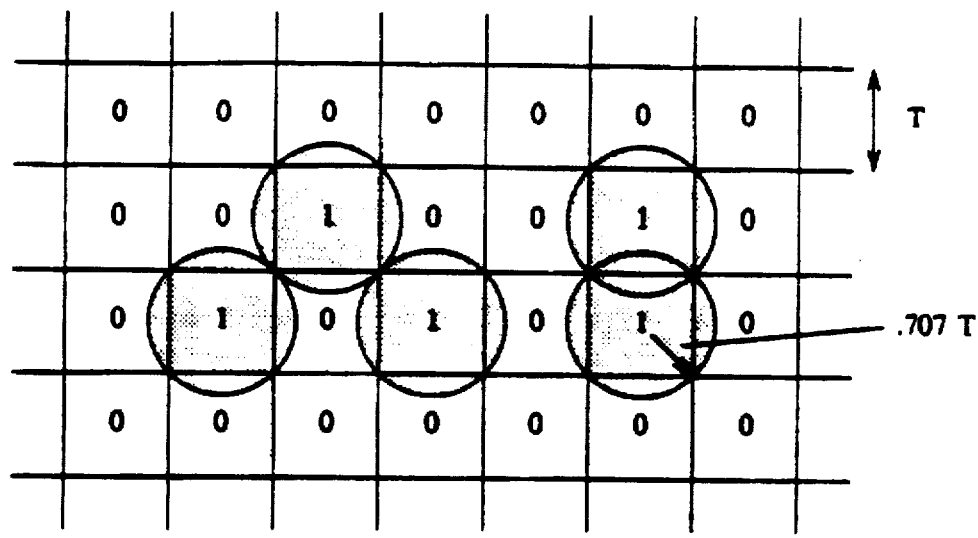
FIG. 15 shows a pattern of black spots in accordance with an ideal printer model.

As illustrated in FIG. 15, black dots produced by an "ideal" printer are black circles (no shading) with radius 0.707 T. The latter is the smallest radius such that black circles placed at all sites completely cover the page. The area of such a dot is 1.57 $T^2$, i.e., 57% larger than a T×T square. Accordingly, horizontally or vertically (but not diagonally) neighboring black dots overlap, and whim dots are darkened by neighboring black dots. Specifically, if a white dot has d horizontally or vertically neighboring (contiguous) black dots, then 14.3 d% of it is blackened.

With an actual printer the black dots are not perfectly round, they're not perfectly black, they are not the ideal size, and they may be somewhat misplaced. Other practical considerations apply to real, rather than ideal, printers. For example, a whim line surrounded by a pair of black lines is not as bright as when surrounded by several black lines. There are many potential causes for such distortions, e.g., ink spreading., spreading of the laser beam, interaction of the laser and the charge applied to the drum, the movement of toner particles in reaction to charge, the heat finishing, reflections of light within the paper, and so on.

It should always be kept in mind that an individual dot at a site (i,j) may only assume one of two values, typically black or whim. However, as a result of phenomena such as those mentioned above, the apparent gray level produced by the printer in the vicinity of site (i,j) depends in a complicated way on $b_{i,j}$ and neighboring bits. Thus, due to the close spacing of dots and the limited spatial resolution of the eye, the apparent gray level can be modeled as having a constant value $p_{i,j}$ in this vicinity. That is, although the gray level is not actually constant, the eye responds, only to an average gray level over the site. It is this average gray level that $P_{i,j}$ represents.

In accordance with one aspect of the present invention, therefore, a printer model takes the general form $$P_{i,j}=P(W_{i,j})1 \leq i \leq N_H, 1 < +j \leq N_w, \quad (7)$$

where $W_{i,j}$ consists of $b_{i,j}$ and the bits in its neighborhood and $P_{i,j}$ is the apparent gray level in the vicinity of site (i,j). For concreteness, it is helpful to visualize the model as producing a gray level at all points in a page (not just at integer sites). In this sense a continuous parameter model analogous to the discrete parameter model of Eq. (7) is given by $$u(s,t)=\sum_{i=1}^{N_H}\sum_{j=1}^{N_w} P(W_{i,j})q(s-iT,t-jT) \; 0 \leq s \leq N_HT, 0 \leq t \leq N_wT \quad (8)$$

where u(s,t) denotes the model gray level at a point s inches from the left and t inches down from the top of a page or other defined surface, and $$q(s,t)=\begin{cases} 1, & \text{if }|s| \leq T/2, |t| \leq T/s \\ 0, & \text{otherwise} \end{cases} \quad (9)$$

In tailoring a model of the above form to a given primer, a main task is to identify how the function P specifying $p_{i,j}$ depends on the bits in the neighborhood of $b_{i,j}$. Though a variety of phenomena can contribute to this dependence, it proves advantageous from an analysis and computational viewpoint to limit the dependence of $p_{i,j}$ to one in which $p_{i,j}$ is determined by the values of the binary matrix array B=[$b_{i,j}$] in a fixed window around the site (ij). In an illustrative embodiment of the present invention, a 3×3 window centered on site (i,j) is conveniently used, though other windows may be appropriate in other particular embodiments. With this typical 3×3 window, the possible values of P can be listed in a table, e.g., with $2^9$ elements.

An Ink-Spreading Model

Figure 16:
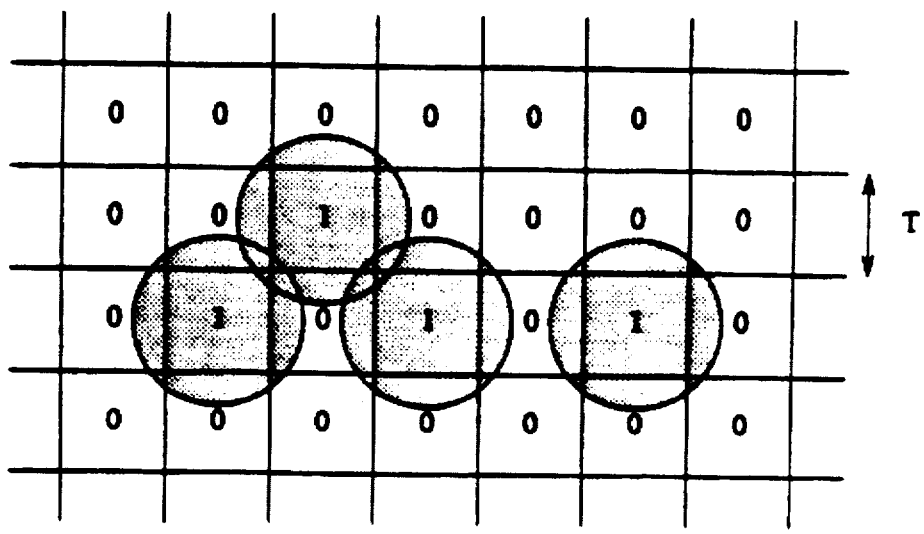
FIG. 16 illustrates an ink spreading phenomenon occurring in certain printers.

A common distortion introduced by most printers is, as illustrated in FIG. 16, that their dots are larger than the minimal covering size, as would occur, e.g., if "ink spreading" occurred. An illustrative "ink-spreading" printer model that accounts for this phenomenon is $$p_{i,j}=P(W_{i,j})=\begin{cases} 1, & \text{if }b_{i,j}=1 \\ f_1\alpha+f_2\beta-f_3\gamma, & \text{if }b_{i,j}=0 \end{cases} \quad (10)$$

where $W_{i,j}$ denotes the window surrounding $b_{i,j}$ consisting of $b_{i,j}$ and its eight neighbors, as indexed below, using compass directions, $$W_{i,j} = \begin{bmatrix} b_{nw} & b_n & b_{ne} \\ b_w & b_{ij} & b_e \\ b_{sw} & b_s & b_{se} \end{bmatrix} \quad (11)$$

Figure 17:
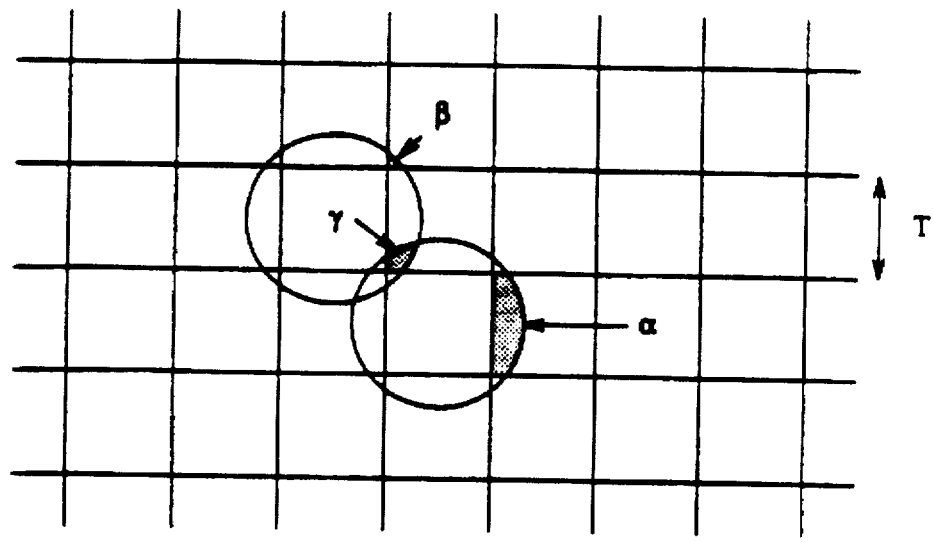
FIG. 17 illustrates geometrically, the meaning of certain parameters used in defining typical printer models.

Function $f_1$ is the number of horizontally and vertically neighboring dots that are black (i.e., the number of ones in the set $\{b_n, b_e, b_s, b_w\}$) function $f_2$ is the number of diagonally neighboring dots (i.e., among $\{b_{nw}, b_{ne}, b_{se}, b_{sw}\}$) that are black and not adjacent to any horizontally or vertically neighboring black dot (e.g., in FIG. 16, for the identified site $(i,j)$, $b_{nw}=1$ and $b_n=b_w=0$). Function $f_3$ is the number of pairs of neighboring black dots in which one is a horizontal neighbor and the other is a vertical neighbor (e.g., $b_n=b_w=1$ would be one such pair). The constants $\alpha$, $\beta$ and $\gamma$ are the ratios of the areas of the respective shaded regions shown in FIG. 17 to $T^2$.

In terms of the ratio p of the actual dot radius to the ideal dot radius $T/\sqrt{2}$ we have $$\alpha = \frac{1}{4}\sqrt{2p^2-1} + \frac{p^2}{2}\sin^{-1}\left(\frac{1}{\sqrt{2p}}\right) - \frac{1}{2} \quad (12)$$

$$\beta = \frac{\pi p^2}{8} - \frac{p^2}{2}\sin^{-1}\left(\frac{1}{\sqrt{2p}}\right) - \frac{1}{4}\sqrt{2p^2-1} + \frac{1}{4} \quad (13)$$

$$\gamma = \frac{p^2}{2}\sin^{-1}\left(\frac{\sqrt{p^2-1}}{p^2}\right) - \frac{1}{2}\sqrt{p^2-1} - \beta \quad (14)$$

The above assumes $1 \leq p \leq \sqrt{2}$ i.e., the black dots are large enough to cover a T×T square, but not so large that black dots separated (horizontally or vertically) by one white dot would overlap. The parameter $\alpha$, which is the largest of the three factors, represents the fraction of a horizontally or vertically neighboring site covered by a black dot. For convenience, this model will be referred to as the $\alpha$ ink spreading model. It should be noted that the model is not linear in the input bits, due to the fact that paper saturates at black intensity. For an ideal printer (no ink spreading) $p=1$, the minimum value, and $\alpha=0.143$, $\beta=0.079$ and $\gamma=0.21$. For $p=\sqrt{2}$, the maximum value, $\alpha=0.46$, $\beta=0.079$ and $\gamma=0.21$.

Figure 18:
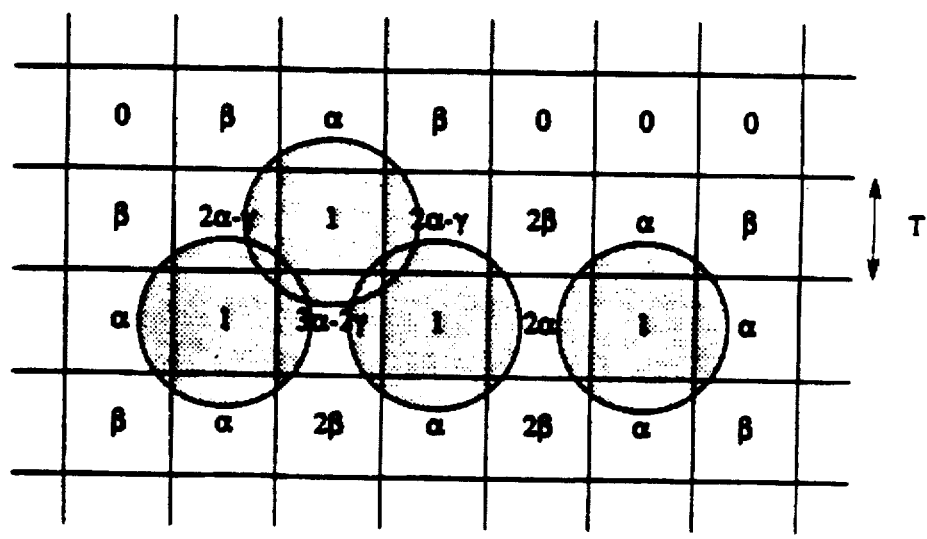
FIG. 18 illustrates the parameters shown in FIG. 7 for particular dot patterns.

For a typical printer of the class noted above $p=1.25$. This value results in $\alpha=0.33$, $\beta=0.029$ and $y=0.98$. FIG. 18 illustrates how the dot pattern in FIG. 16 is modeled with these values. To illustrate one use of this model using a 3×3 matrix of surrounding values to predict the effective gray scale in an area, it is useful to consider the array of binary values which includes, for each horizontal string, the repeating 6-bit patterns shown in the left column in Table 1. For example, one such horizontal string would be 100000100000 . . . 100000. This horizontal string is then replicated vertically, i.e., identical ones of such strings occur from the top of the image to the bottom of the image. Table 1 illustrates some interesting statistics relating to such an array.

TABLE 1

| Pattern | Frequency of 1's | Darkness Predicted by Ink-Spreading Model Windows 3($\alpha$ = 0.33) |
|---|---|---|
| 100000 | .17 | .28 |
| 100100 | .33 | .55 |
| 101000 | .33 | .55 |
| 110000 | .33 | .44 |
| 101010 | .5 | .83 |

TABLE 1-continued

| Pattern | Frequency of 1's | Darkness Predicted by Ink-Spreading Model Windows 3($\alpha$ = 0.33) |
|---|---|---|
| 101100 | .5 | .72 |
| 111000 | .5 | .61 |
| 110110 | .67 | .89 |
| 101110 | .67 | .89 |
| 111100 | .67 | .78 |
| 111110 | .83 | .94 |
| 111111 | 1.0 | 1.0 |

Since the selected patterns appearing in Table 1 are horizontally periodic, the gray level of a white dot depends only on the presence or absence of horizontally neighboring black dots. Specifically, the gay level of a white dot is $\alpha$ 2$\alpha$ or 0, depending on whether there are one, two or no horizontally neighboring black dots. One can see from the gray levels predicted in Table 1 that the ink-spreading model does much to explain how patterns with the same numbers of ones can have different gray levels. For example, it predicts the relative gray levels among the patterns with 3 ones. On the other hand it does not explain why the pattern 110110 produces an image which is darker than the pattern 101110, or why 101010 produces an image which is darker than 111110.

One-Dimensional Models

It proves convenient for some purposes to adopt a simplified one-dimensional printer model. This is equivalent to a model for printing one line (or column) or as a model for printing vertically (or horizontally) invariant images, i.e. those having all horizontal (or vertical) lines the same, as for the patterns of Table 1. With such a model, the input to the printer is a one-dimensional sequence where $$p_k = P(W_k), \quad (15)$$

Figure 19:
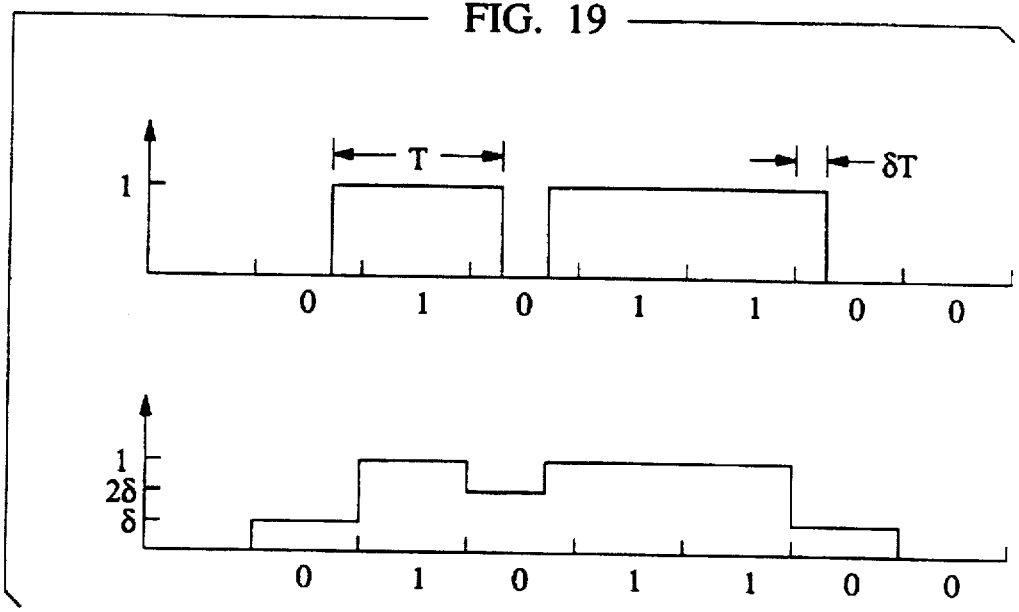
FIG. 19 illustrates certain aspects of a one-dimensional ink-spreading printer model.

$W_k$ denotes the bits in some neighborhood of $b_k$ and $P(W_k)$ is some function thereof. A one-dimensional version of the ink-spreading model presented above is $$p_k = P(W_k) = \begin{cases} 0, & \text{if } b_k = 000 \\ \delta, & \text{if } b_k = 001 \text{ or } b_k = 1000 \\ 2\delta, & \text{if } b_k = 101 \\ 1, & \text{otherwise} \end{cases} \quad (16)$$

where $W_k = (b_{k-1}, b_k, b_{k+1})$ is a window surrounding $b_k$ and $\delta$ is a parameter between 0 and 1. As illustrated in FIG. 19, this model reflects those situations in which a black dot overlaps a fraction $\delta$ of the neighboring sites to the left and the right. Again the model output is not linearly related to input bits.

To identify the parameter $\delta$, it proves convenient to view this model as a projection of the two-dimensional ink spreading model onto one dimension. Accordingly, $\delta=\alpha=0.33$ has been found to be a good value for typical ones of the class of printers noted above. Further discussion of one-dimensional models will assume $\delta=\alpha$. Note that for horizontally (vertically) periodic patterns, the one-dimensional model predicts exactly the same gray levels as the two-dimensional model with interleaved horizontal (vertical) all-zero lines.

The need for one-dimensional ink-spreading models with window size larger than 3 will become apparent when considering that in Table 1 the 101010 pattern appears about as dark as 110110, even though it only has three-fourths as many 1's. A close examination of printer output shows that the white line in the middle of 11011 appears much larger and brighter than the white dot in the middle of 01010. Moreover, the white dot in the middle of 1110111 appears larger and brighter than that in the middle of 0110110. When requirements so dictate such effects can be better captured in a printer model with window size larger than 3 (or 3×3 in two dimensions). Thus, while the particular windows and parameters used in the illustrative printer models given above are useful for predicting perceived gray levels with improved accuracy, particular models may require adaptation as dictated by more complete information about (and control of) the underlying physical parameters (e.g., extent of ink spreading), or by more complete understanding of perceptual considerations.

Error Diffusion Halftoning Technique

Error diffusion halftoning techniques have been described generally above. To facilitate a better understanding of improvements achieved by the present invention, some aspects of this prior art technique will now be reviewed.

In the error diffusion halftoning each image pixel is compared to a threshold which depends upon "prior" image pixels, usually above and to the left. Alternatively viewed, each image pixel is compared to a fixed threshold, after a correction factor is applied to its original gray level to account for past errors. Let $[x_{i,j}]$ be a two-dimensional gay-scale image (after possible interpolation to include the same number of dots as the desired binary image, such as, e.g., the creation of additional input signals when the input gray-scale image is smaller than the binary image to be printed), where $x_{i,j}$ denotes the pixel located at the j-th row and the j-th column. It is useful to assume that the image has been scanned, and will be processed left to right and top to bottom. Other orderings are, of course, possible as necessary in particular cases. The binary image $[b_{i,j}]$ produced by error diffusion is obtained by the following set of equations $$v_{i,j} = x_{i,j} - \sum_{m,n} h_{m,n} e_{i-m,j-n} \quad (17)$$

$$b_{i,j} = \begin{cases} 1, & \text{if } v_{ij} > t \\ 0, & \text{otherwise} \end{cases} \quad (18)$$

$$e_{i,j} = b_{i,j} - v_{i,j} \quad (19)$$

Here $v_{i,j}$ is the "corrected" value of the gray-scale image. The error $e_{i,j}$ at any "instant" (ij) is defined as the difference between the "corrected" gray-scale image and the binary image. The "past" errors are low-pass filtered and subtracted from the current image value $x_{i,j}$ before it is thresholded to obtain the binary value $b_{i,j}$, where $[h_{i,j}]$ is the impulse response of the low-pass filter. Thus errors are "diffused" over the image.

Figure 20:
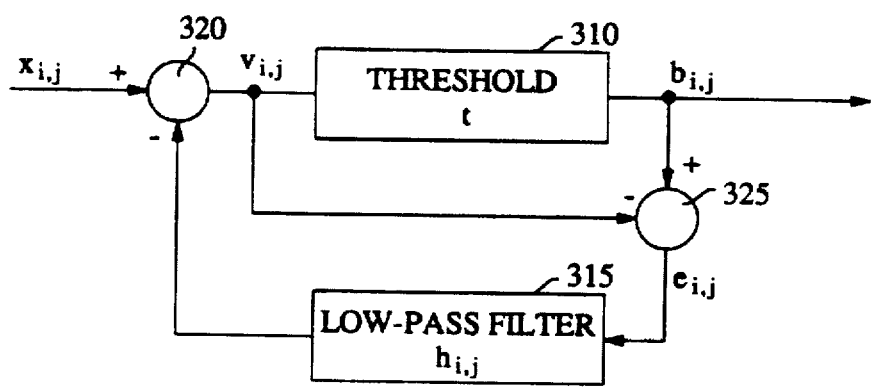
FIG. 20 is a block/flow diagram illustrating the prior art error diffusion halftoning technique.

A diagram of the error diffusion algorithm is shown in FIG. 20. The threshold t represented by block 310 in FIG. 20 is fixed at the exemplary value 0.5, the middle oft he gray-scale range. Difference elements-are shown as 320 and 325 in FIG. 20. Typically, a page image is scanned left to right and top to bottom i.e., starting at the top left and finishing at the lower right. The low-pass filter $h_{i,j}$ represented by block 315 in FIG. 20 has non-symmetric half-plane support, the two-dimensional equivalent of causality. That is, the effect of a prior pixel (to the left or above) can be accounted for, but a future pixel, not yet having occurred, does not contribute to any error signal. The filter coefficients are positive and their sum is equal to one, thereby assuring stability. Error diffusion halftoning usually requires only one pass through the data.

Various error diffusion filters have been suggested in the literature (see the Ulichney paper, supra). In the following examples a filter proposed by Judice and Ninke in "A Survey of Techniques for the Display of Continuous-Tone-Pictures on Bilevel Displays," *Comp. Graphics and Image Processing*, Vol. 5, pp. 13–40, 1976, will be used. The filter is characterized by Table 2.

TABLE 2

|  |  |  | $\frac{7}{48}$ | $\frac{5}{48}$ |
|---|---|---|---|---|
| $\frac{3}{48}$ | $\frac{5}{48}$ | $\frac{7}{48}$ | $\frac{5}{48}$ | $\frac{3}{48}$ |
| $\frac{1}{48}$ | $\frac{3}{48}$ | $\frac{5}{48}$ | $\frac{3}{48}$ | $\frac{1}{48}$ |

TABLE 3

| ● | $\frac{7}{12}$ | $\frac{5}{12}$ |
|---|---|---|

In the one-dimensional version of error diffusion the illustrative values to be used for the filter are shown in Table 3. There is no fundamental difference between the one and two-dimensional versions of error diffusion.

Use of Printer Models in Halftoning

Figure 21:
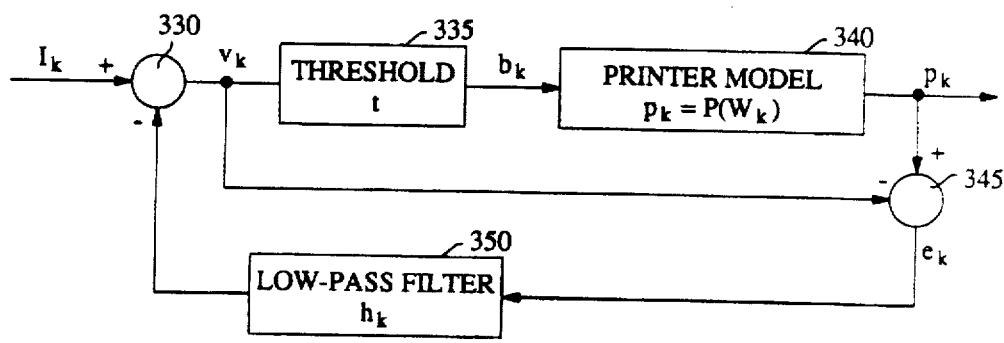
FIG. 21 is a block/flow diagram illustrating modifications to the error diffusion techniques illustrated in FIG. 20.

Through the use of printer models described above, the present invention overcomes many of the disadvantages of the prior art halftoning techniques, including those present in error diffusion halftoning. A block/flow diagram reflecting one aspect of a modified error diffusion system that compensates for ink spreading is shown in FIG. 21. Only the ink spreading contributions of the "present" and "past" pixels are used. Images printed using the system represented in FIG. 21, with printer models characterized by Eq. (10) or Eq. (16) have the improved apparent gray level and, at the same time, have the sharpness characteristic of error diffusion. In particular, the performance of this modified error diffusion system in regions of rapidly changing gray level and in the presence of printer distortions is very good.

In regions of constant gray level, the modified error diffusion algorithm of the present invention produces at least as many gray levels as the prior art "Classic" technique. In common with prior error diffusion techniques, the model-based modifications in accordance with the present invention minimize low-frequency artifacts by shaping the noise, i.e., moving it to the higher frequencies where it is not visible or moving it to a blue noise range, where it proves very pleasant to the eye. In regions of slowly changing gray level, error diffusion does not suffer from the false contouring; there is no need to add microdither to the image.

The system of FIG. 21 differs in overall organization from that of the prior art system shown in FIG. 20 by the inclusion and use of the printer model 340. Thus, in particular, the output of the thresholding operation, i.e., the actual binary pattern sent to the printer (represented by the functional block 335 in FIG. 21), is no longer used to generate the error signal to be fed back to modify the input gray scale values before submitting them to the thresholding step. Rather, a modified version of the binary pattern processed in accordance with printer model 340, and reflecting the particular characteristics of the printer, is used as the feedback sequence. This printer model may advantageously take the form of Eqs. (10–14) or Eq. (7). As in the prior art, this feedback sequence from difference circuit 345 is low pass filtered using, e.g., Eqs. (17–19), with the coefficients of Table 2 or Table 3 above. It will be understood by those skilled in the art that different particular filtering coefficients may be used. It should be noted that the use of past error values in filter 350 is accomplished in standard fashion by storing required past signals in memory forming part of the digital filter 350. The modified error diffusion algorithm that compensates for dot overlap is shown in FIG. 21. The modified error diffusion equations are $$v_{i,j} = x_{i,j} - \sum_{m,n} h_{m,n} e_{i-m,j-n}^{i,j} \tag{20}$$

$$b_{i,j} = \begin{cases} 1, & \text{if } v_{i,j} > t \\ 0, & \text{otherwise} \end{cases} \tag{21}$$

$$e_{m,n}^{i,j} = P_{m,n}^{i,j} - v_{m,n} \text{ for } (m,n) < (i,j) \tag{22}$$

where $(m,n) < (i,j)$ means $(m,n)$ precedes $(i,j)$ in the scanning order and $$P_{m,n}^{i,j} = P(W_{m,n}^{i,j}) \text{ for } (m,n) < (i,j) \tag{23}$$

where $W^{i,j}{}_{m,n}$, consists of $b_{m,n}$ and its neighbors, but here the neighbors $b_{k,l}$ have been determined only for $(k,l) < (i,j)$; they are assumed to be zero for $(k,l) > (i,j)$. Since only the dot-overlap contributions of the "past" pixels can be used in Eq. (20), the "past" errors keep getting updated as more binary values are computed.

Listing 1 is a sample computer program in the well-known C Language which, when executed on a typical general purpose computer, e.g., the Spark Station Model 1+ processor marketed by Sun Microsystems, will perform the processing shown in FIG. 21 and described above. Listing 1 assumes that the input values for the sampled gray scale image, $I_k$, have been stored, in the processor's memory as have the low pass filter values and other needed data and programs. Those skilled in the art will adapt the procedures in Listing 1 to particular other computers and languages as needed. The output to the printer is, as in all cases described herein, the values for $b_k$.

Particular applications for the above-described printer model-based halftoning technique, and those described below, will use other implementing hardware and, where appropriate, software to suit the specific requirements of the application. For example, in a modification to a printer, the required processing can be accomplished by a microprocessor incorporated within the printer. Model information and the controlling software can conveniently be stored in read only memory units (ROMs).

Printer Model Based Least Squares Error Halftoning

An alternative to the modified error diffusion algorithm described above will now be presented. This alternative approach is based on the well-known least squares error criterion. In this alternative approach, it will be assumed that a printer model, a visual perception model and an image are given. The cascade of the printer and visual perception models will be called the perceptual printing model. The least-squares approach to model-based halftoning in accordance with this aspect of the present invention then finds the binary array (one bit per image pixel) that causes the perceptual printing model to produce an output that is as close as possible (with respect to squared error) to the response of the visual perception model to the original image. Rather than simply assuming the eye is a low-pass filter that averages adjacent bits (as in conventional ordered dither and error diffusion), this method actively exploits the visual model. While previous techniques are sometimes robust to (tolerant of) printer distortions (such as resistance to ink spreading), the present inventive method actively exploits printer distortions to create the best possible halftoned reproduction. The result is more apparent shades of gray and better tracking of edges. Note that, since the eye filter is noncausal, the least-square approach is also noncausal. That is, the decisions at any point in the image depend on "future" as well as "past" decisions. In error diffusion the decisions at any point in the image depend only on the "past". It is this noncausality of the present least squares approach that helps give it the freedom to make sharp transitions and better track edges.

One-Dimensional Least-Squares Halftoning

A one-dimensional least-squares halftoning technique of the present invention is conveniently implemented using a method based on the Viterbi algorithm. See e.g., A. J. Viterbi, "Error Bounds for Convolutional Codes and an Asymptotically Optimum Decoding Algorithm," *IEEE Trans. Inf. Th.*, vol. IT-13, pp. 260–269, April 1967, and G. D. Forney, Jr., "The Viterbi Algorithm," *Proc. IEEE*, vol. 61, pp. 268–278, Mar. 1973. Because of the Viterbi algorithm, only one pass through the data is required for the least-squares approach. The present least-squares halftoning method using the Viterbi algorithm will now be described in the context of one-dimensional image $x=(x_0, \ldots, x_{N-1})$.

Figure 22:
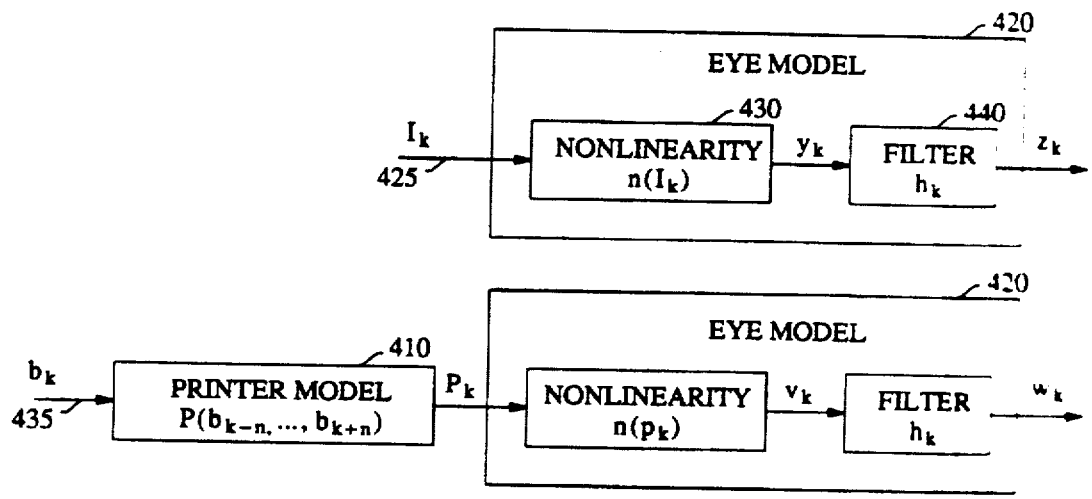
FIG. 22 shows a block/flow diagram of an embodiment of the present invention based on one-dimensional least squares error minimization.

The overall system to be described is shown in FIG. 22. There, the input to the least-squares halftoning system in accordance with the present invention is, a one dimensional images $=(x_0, \ldots, x_{N-1})$ applied on input 425 in FIG. 22. A printer model 410 shown receiving the binary array $b_k$ or input 435, in FIG. 22 may e.g., be of the type given above in connection with Eq. (15), and have a sliding-window form given by $$p_k = P(b_{k-m}, \ldots, b_{k+n}). \tag{24}$$

This window will cause the printer output to be based on binary inputs extending n bits in either direction from the current bit. Finally, an eye model 420 including a memory-less nonlinearity $n(x)$, shown as 430 in FIG. 22, followed by a finite impulse response filter 440 with impulse response $h_{-m}, \ldots, h_m$, will be used.

In the least-squares approach the halftoned approximation $b_0, \ldots, b_{N-1}$ is sought that minimizes the squared error $$\epsilon = \sum_{k=0}^{N-1} (z_k - w_k)^2 \tag{25}$$

where, as illustrated in FIG. 22

$$z_k = y_k * h_k = n(x_k) * h_k \tag{26}$$

$$w_k = v_k * h_k = n(p_k) * h_k \tag{27}$$

$$p_k = P(b_{k-m}, \ldots, b_{k+n}) \tag{28}$$

Again, * indicates convolution.
The boundary conditions are $$b_k = 0 \text{ for } k < m+n, k > N-m-n-1$$

$$x_k = 0 \text{ for } k < m, k > N-m-1.$$

These boundary conditions guarantee that the perceived images (the response of the printer perceptual model to the bits and the response of the perceptual model to the original image) are perfectly white for k<0 and k>N−1, and gradually darken to the "true" intensity in a border of m+ndots.

In formulating the minimization so the Viterbi algorithm may be conveniently applied, the approach of G. Ungerboeck, "Adaptive Maximum likelihood Receiver for Carrier-modulated Data-transmission Systems," *IEEE Trans. Commun.*, vol. COM-22, pp. 624–636, May 1974, A. S. Acampora, "Maximum-likelihood Decoding of Binary Convolutional Codes on Band-limited Satellite Channel", *National Telecommunications Conference*, 1976, and in A. J. Viterbi and J. K. Omura, *Principles of Digital Communications and Coding*, McGraw-Hill, New York, 1979, pp. 272–277] is followed generally, as it results in fewer computations. As a first step, it be shown that $$\epsilon \overset{\Delta}{=} \sum_{k=0}^{N-1} (z_k - w_k)^2 \; = \; \|z\|^2 + \tag{29}$$

$$\sum_{k=m}^{N-m-1}\left(-2v_k Z_k + v_k^2 H_0 + 2v_k \sum_{j=k-2m}^{k-1} v_j H_{k-j}\right)$$

$$= \|z\|^2 + \sum_{k=m}^{N-m-1} \gamma_k,$$

where $$\|z\|^2 = \sum_{k=0}^{N-1} z_k^2, \tag{30}$$

$$\gamma_k = 2v_k Z_k + v_k^2 H_0 + 2v_k \sum_{j=k-2m}^{k-1} v_j H_{k-j},$$

$$Z_k = \sum_{j=k-m}^{k+m} z_j h_{j-k},$$

$$H_k = \sum_{j=k-m}^{k+m} h_{j-k} h_j.$$

From Eq. (29), the squared error $\epsilon$− is the sum of $\|z\|^2$, k which does not depend on the bits $b_0, \ldots, b_{N-1}$ to be selected, plus the $\gamma_k$'s, each depending on a different subset of the bits. In the Viterbi algorithm, the minimization of $\epsilon$ is simplified by introducing the notion of state, which is a set of bits from which a $\gamma_k$ can be determined. Since $\gamma_k$ is a function of $u_{k-2m}, \ldots, u_k$ and since each $v_j$ is a function of $b_{j-n} \ldots b_{j+n}$ the state at time k may be taken to be $$S_k = (b_{k-2m-n+1}, \ldots, b_k, \ldots, b_{k+n}) \tag{31}$$

i.e., it consists of 2m+2n consecutive bits neighboring $b_k$ will be considered to be the "present" bit and $b_{k+n}$ to be the "most recent" bit. The state has been defined so that $\gamma_k$ can be determined from $S_{k-1}$ and $S_k$, so that $S_k$ can be determined from. $S_{k-1}$ and the most recent bit $b_{k+n}$, and so that $S_k$ contains as few bits as possible. In essence, the state $S_{k-1}$ summarizes all that one needs to know to determine $\gamma_k$ expect the present bit. It follows from Eqs. (29), (30) and the definition of state that $$\epsilon = \|z\|^2 + \sum_{k=m}^{N-m-1} \mu(S_{k-1}, S_k), \tag{32}$$

where $\mu(\ldots)$ is a function determined by Eq. (30) and from the boundary condition $S_{m-1} = (0, \ldots, 0)$.

Since there is a one-to-one correspondence between sequences of bits $b_0, \ldots, b_{N-1}$ and sequences of states $S_{m-1}, \ldots, S_{N-m-1}$, one may minimize $\epsilon$ by finding the state sequence $S_{m-1}, \ldots, S_{N-m-1}$ that minimizes Eq. (32), rather than finding the binary sequence that minimizes Eq. (29). It is then a straightforward matter to derive the binary sequence from the state sequence.

The Viterbi algorithm is an efficient way to find the minimizing state sequence. Let S denote the set of all possible states (the set of all binary sequences of length 2m+2n). For each k in the range m,m+1,...,N-m-1 and for each state s ∈ S the Viterbi algorithm finds a state sequence $S_m, \ldots, S_{k-1}$, s (ending at time k in state $S_k = s$) for which $$\|z\|^2 + \sum_{j=m}^{k} \mu(S_{j-1}, S_j) \tag{33}$$

is minimum among all state sequences ending in s at time k. Let $\sigma_k(s)$ denote the minimizing state sequence, and let $\epsilon_k(s)$ denote the resulting minimum value. Then the state sequence that minimizes Eq. (32) (i.e., the desired solution) is $(\sigma_{N-m-1}(s^*), s^*)$ where is the state for which $\epsilon_{N-m-1}(s^*)$ is the smallest.

For each k starting with k=m and each s, the algorithm finds $\epsilon_k(s)$ and $\sigma_k(s)$ using the recursion:

$$\epsilon_k(s) = \min_{S_{k-1}} \{\epsilon_{k-1}(S_{k-1}) + \mu(S_{k-1}, s)\} \tag{34}$$

$$\sigma_k(s_k(S^*_{k-1}), s) \tag{35}$$

where $S_{k-1}^*$ achieves minimum in $\epsilon k(s)$ and $S_{m-1} = (0, \ldots, 0)$.

In regard to the complexity of the algorithm, for any state s there ate precisely two states that can precede it. Thus the minimization in Eq. (32) involves two computations of $\mu$ (...), an addition and a binary comparison. If sufficient memory is available, the function $\mu$ may be precomputed and saved as a matrix. In this case, the complexity of the algorithm, in operations per dot, is proportional to the number of states: $N_s = 2^{2m+2n}$. Thus, complexity increases exponentially with m and n, but is independent of the size of the image.

There are ways to reduce the number of states (complexity), at the cost of some suboptimality, i.e., an increase in $\epsilon$. The state reduction approach based on the following observations: The state at time k-1 was defined in such away that it contained all bits needed to determine $V_{k-2m}, \ldots, V_{k-1}$, which in turn enter into the third term of Eq. (30), namely, $$2v_k \sum_{j=k-2m}^{k-1} v_j H_{k-j} \tag{36}$$

Ordinarily, some of the last terms of H, say $H_{-2m}, \ldots H_{-2m+t-1}$, are so small that the corresponding terms of the sum, $v_j H_{k-j}$, can be dropped without much effect. In this case, the state at time k may be redefined as $$S_k = (b_{k-2m-n+1+t}, \ldots, b_k, \ldots, b_{k+n}) \tag{37}$$

so that now there are only $2^{2m+2n-t}$ possible states.

It will be seen that, when compared with the prior art techniques, e.g., those of Anastassiou, the present invention does not assume perfect printing. The addition of a printer model in accordance with the teachings of the present invention provides a major advance in the art. Also, the above-described mean square error process provides a closed form solution that will be useful in a variety of particular applications to those skilled in the art. It is deemed that those skilled in the art with the detailed algorithmic description and program example for the error diffusion embodiment will be well able to implement the above-described Viterbi-based implementation of the mean-square-error algorithm for generating the binary array for application to a printer such as those in class of laser printers identified above.

Two-Dimensional Least-Squares Halftoning

An illustrative two-dimensional least-squares halftoning technique of the present invention is implemented by iterative optimization techniques.

Figure 23:
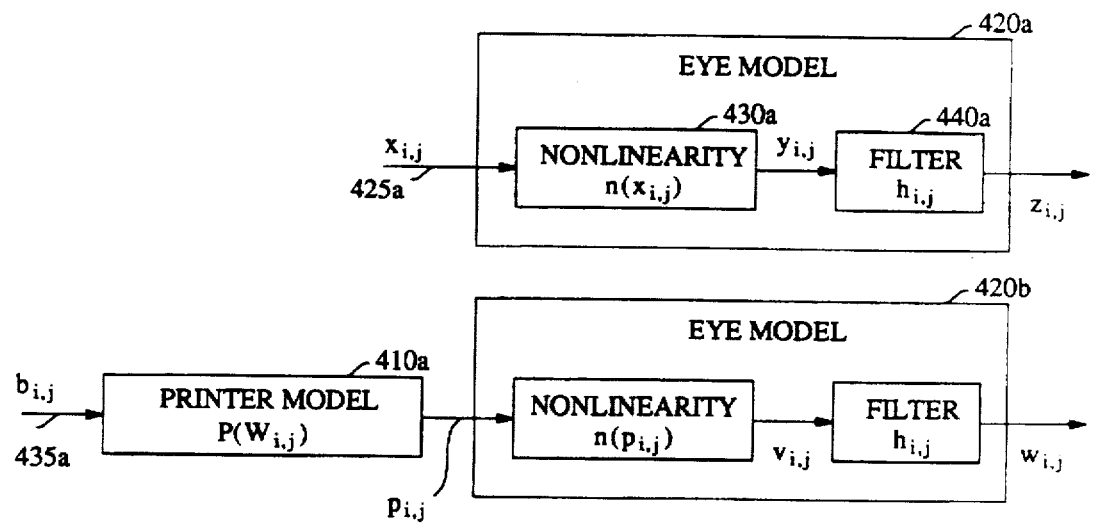
FIG. 23 shows a block/flow diagram of an embodiment of the present 10 invention based on two-dimensional least squares error minimization.

The overall system to be described is shown in FIG. 23. There, the input to the least-squares halftoning system is a two-dimensional gay scale image $[x_{i,j}]$ applied on input 425a. image $[x_{i,j}]$ has been interpolated so that it has the same number of pixels as the binary array $[b_{i,j}]$ which controls the printer. Thus, $i=1, \ldots, N_w$, and $j=1, \ldots, N_H$, where $N_w$ is the width of the printable lines in dots and $N_H$ is the number of printable lines. A printer model 410a shown receiving, the binary array $[b_{i,j}]$ on input 435a may, e.g., be of the type given above in connection with Eq. (7). An eye model 420a includes a memoryless nonlinearity $n(x_{i,j})$ 430a followed by a finite impulse response filter 440a with impulse response $[h_{i,j}]$. Eye model 420b is similarly defined.

In the two-dimensional least-squares approach the halftoned approximation $[b_{i,j}]$ is sought that minimizes the squared error $$E = \sum_{i=0}^{N_w-1} \sum_{j=0}^{N_H-1} (z_{i,j} - w_{i,j})^2 \quad (38)$$

where as illustrated in FIG. 23, $z_{i,j} = y_{i,j} * h_{i,j} = n(x_{i,j}) * h_{i,j};$ $w_{i,j} = v_{i,j} * h_{i,j} = n(p_{i,j}) * h_{i,j};$ and $p_{i,j} = P(W_{i,j}).$ Again, * indicates convolution.
The boundary conditions are:

$b_{i,j}=0$ for $i<1, i>N_w, j<1, j>N_H$ $x_{i,j}=0$ for $i<1, i>N_w, j<1, j>N_H.$ These boundary conditions provide that no ink is placed outside the image borders.

A two-dimensional least squares solution to Eq. (38) may be obtained by iterative techniques. Such techniques may employ an initial estimate of the binary half-toned image $[b_{i,j}]$, which could be a simple image, e.g., all white or all black, or the output of any halftoning algorithm, including the modified error diffusion or the one-dimensional least-squares algorithm described above.

In an illustrative iterative technique, given an initial estimate of $[b_{i,j}]$ as described above, for each image site (i,j), the binary value $b_{i,j}$ that minimizes the squared error is determined:

$$E_{i,j} = \sum_{k=1-a}^{i+a} \sum_{l=j-b}^{j+b} (z_{k,l} - w_{k,l})^2, \quad (39)$$

where a and b are given integers which define an area within the image $[_{i,j}]$. An iteration is complete when the minimization is performed once at each image site. So, for example, for image site (i,j), this technique determines which of the two possible binary values at the site provides the smaller error wig the area defined by a and b. This value is chosen for the site (i,j) and, for a given iteration, the process continues for all the sites in some fixed or random order, typically a raster scan. A few iterations (typically 5-10) are required for convergence. It is preferred that a=b=0.

In a variation of the above iterative technique, given an initial estimate of $[b_{i,j}]$, for every image site (i,j) (in some fixed or random order, usually a raster scan), the binary values $b_{k,l}, k=i-i_1, \ldots, i+i_2, l=j-j_1, \ldots, j+j_2$ that minimize the squared error are determined:

$$E_{i,j} = \sum_{k=i-i_1-a}^{i+i_2+a} \sum_{l=j-j_1-b}^{j+j_2+b} (z_{k,l} - w_{k,l})^2 \quad (40)$$

where $a, b, i_1, i_2, j_1, j_2$ are given integers. Again, it is preferred that a=b=0. The amount of computation doubles with each increment in one of the integers $i_1, i_2, j_1, j_2$. A few iterations (typically 3–5) are required for convergence.

In some cases it may be advantageous to omit filtering the image $[x_{ij}]$ by the eye model 420a, i.e., to set $z_{ij}=x_{ij}$. This may effect sharper halftoned images.

It should be understood that the above-described models, window sizes, filter coefficients and other system and method parameters are merely illustrative. Other particular printer (and eye) models may prove advantageous in particular circumstances, as will be apparent to those skilled in the art.

While it has been assumed that the printer parameters are fixed and known in advance before any of the processing described above, no such limitation is essential to the present invention. That is, it is advantageous in some circumstances to adjust the printer model to account for changes in printer parameters, e.g., over time. In particular, it is possible to sense printer parameters such as dot size or shape as part of the printing process. Alternatively, such sensing can be accomplished, as required, separately from the actual printing process, i.e., off line. After such sensing, the processing can incorporate the new printer parameters in all future halftoning operations.

Perceptual Coding of Images for Halftone Display

A further illustrative embodiment of the present invention is presented in FIG. 24. The embodiment provides for the coding of digitized gray-scale images for facsimile transmission and printing on a laser printer. An illustrative digitized image may comprise 512×512 "pixels." Each pixel is an eight-bit code specifying for a small portion of the image (i.e., 1/512th×1/512th of the image) one of $2^8$ (or 256) gray levels.

A digitized image for communication by the embodiment is provided to a gray-scale encoder 500. Once encoded, the image is communicated through a channel 600. This channel 600 may comprise a communication network (or circuit) and any required transmission and reception circuitry, such as a modem; storage for the encoded image; or a combination of both network and storage. The communicated image is received by a gray-scale decoder 700. The gray-scale decoder 700 recovers a gray-scale image from the coded data. Digital halftoning 800 is performed on the recovered gray-scale image. The resulting halftoned image is printed by a laser printer 900.

In this illustrative embodiment, the gray-scale coder may comprise the perceptual coder presented in the FIGS. 2, 4, 5, and 6. The gray-scale decoder may comprise that presented in FIGS. 7 and 10.

Halftoning of Images

Digital halftoning 800 is a process by which patterns of binary pixels suitable for printing are generated from a continuous-tone image (such as the original or recovered gray-scale images discussed above). Because the eye does not faithfully detect high spatial frequencies, patterns of binary pixels printed on paper have the appearance of the continuous-tone image from which they were generated.

There are several techniques which provide halftoned images..These include ordered, clustered dither techniques, error diffusion techniques, and least square error techniques. For purposes of the illustrative embodiment presented in FIG. 24, ordered, clustered dithering o is used. (It will be understood by the ordinary artisan that any halftoning technique could be employed in this embodiment, including, e.g., the error diffusion or least squares model-based halftoning techniques described above.)

FIG. 25 presents an illustrative halftoner 800 for use with the embodiment presented in FIG. 24. The halftoner 800 comprises a data interpolator 810, a summer 815 for adding uniform white noise to interpolated dam, and a classical halftone screen 820.

Because the desired scale of a halftoned image to be printed on paper may be larger than that of a digitized continuous-tone image received by the halftoner 800 from the gray decoder 700, an interpolator is utilized to provide extra data to compensate for scale differential. In a typical case, the halftoner 800 will receive a digitized continuous-tone image, $y_n$, of dimensions $N_1 \times N_2$ from the gay decoder 700. The dimensions of the dot pattern $M_1 \times M_2$ are obtained from the printer resolution and the image dimensions. Given a fixed printer resolution R (dots/inch) and desired dimensions of the image to be printed, interpolation may be performed to provide the additional data needed for the dimensions of the printed image. The dimensions of the interpolated continuous tone image, $\mu_m$, are $M_1 \times M_2$. An illustrative well known technique for this is bilinear interpolation, which provides the ability to expand the received continuous-tone image to arbitrary dimensions.

Ordered, clustered dither halftoning, well known in the art, is provided by halftoning screen 820. The screen 820 generates a binary image, $x_m$, of dimensions $M_1 \times M_2$, by comparing pixels of a continuous-tone image (output from summer 815) to an array of periodic thresholds (this process is sometimes called screening). An example of such an array is the 8×8 classical screen, one period of which is shown in FIG. 26. The image intensity (blackness or gray level) is assumed to vary between 0 (white) and 255 (black). This metric of intensity, 0 to 255, represents varying amounts of ink on paper.

Figure 27:
FIG. 27 presents artificial contours which result from the mapping of 256 gray-scale levels to 33 levels from classical halftone screening.
Figure 28:
FIG. 28 shows the elimination of undesirable contours present in FIG. 26 through the addition of micro-dither.

Gray-scale images for halftoning may contain regions of constant image intensity, rapidly changing image intensity, and slowly changing image intensity. In regions of slowly varying intensity, ordered, clustered dither halftoning, techniques may produce artificial contours (i.e., undesirable step-changes in image intensity) in the resulting printed image. These contours represent 33 distinct gray levels or steps available from halftoning using classical screening. See FIG. 27 showing such artificial contours in decreasing image intensity. This contouring problem can be eliminated by the addition of pseudo-random noise, $w_m$, dimensions $M_1 \times M_2$, to the image data, $\mu_m$, produced by the interpolator 810 as shown in FIG. 25. Such noise may be uniformly distributed white noise with amplitude equal to half the step size of the distinct gray levels. This pseudo-random noise will be referred to as micro-dither to distinguish it from spatial dither. FIG. 28 shows that the addition of micro-dither can eliminate the undesirable contours present in FIG. 27.

Perceptual Analysis

As discussed above, an illustrative coder embodiment useful in carrying out the present invention is presented in FIGS. 2, 4, 5, and 6. The coder includes perceptual model 28. In order to provide the base sensitivities 102 of the perceptual model 28 (see FIGS. 2 and 5), a perceptual analysis is conducted. The perceptual analysis may take into account the characteristics of the printer, the type of halftoning technique employed, and viewing conditions.

An illustrative perceptual analysis is conducted using a 300 dots/inch write-black laser printer, such as that sold under the trademark "HP lacerate," with an 8×8 classical o halftoning screen, such as that discussed above with reference to FIG. 26. A micro-dither as described above is added to the output of the bilinear interpolator 810.

In the illustrative perceptual analysis, the resolution of the original images is 512×512 pixels. The dimensions of the printed image are 5.12×5.12 inches. At 300 dots/inch, the resolution of the dot patterns is 1536×1536 pixels. Thus, $N_1 = N_2 = 512$ and $M_1 = M_2 = 1536$.

The illustrative perceptual analysis determines an amount of noise that can be added to each sub-band of an arbitrary image without being perceived by a viewer. Preferably, this amount of noise is the maximum imperceptible additive noise. Once determined, such noise can be used as the basis for timing an encoder. For example, the noise may be used as a basis for determining sub-band DPCM quantization step size. As discussed above, determining this level of noise is done by first determining the noise sensitivity in each sub-band given a flat mid-gray image. Next, the change in sensitivity with gray level is determined.

In the illustrative perceptual analysis, an image of 512× 512 pixels, each having an intensity equal to 124 is used. This level of pixel intensity is on a threshold of the classical matrix and thus represents a worst case regarding sensitivity to noise. The image is filtered into 16 sub-bands and uniformly distributed white noise of a given rms level is added to the center 32×32 pixels of one sub-band of the gray-scale image. An image is then reconstructed from these sub-bands. The reconstructed image, which exhibits a 128× 128 noise square, is then halftoned using the technique described above and presented in FIG. 25.

Figure 29:
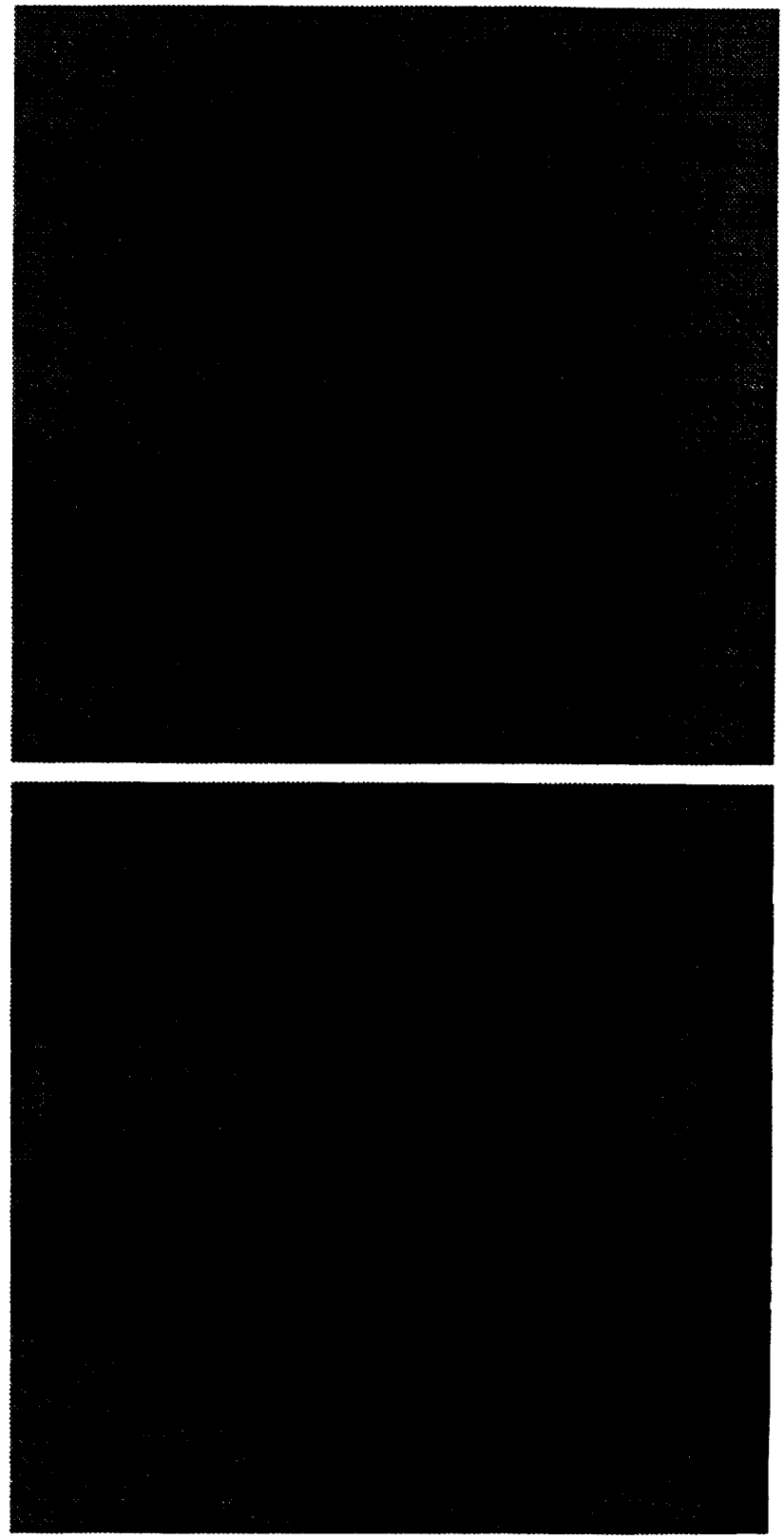
FIG. 29 presents a sub-band image with a noise square and an identical image without the noise square.

The halftoned reconstructed image with the noise square is printed on a 8.5×11 inch page along with a similar image without the noise square, as shown in FIG. 29 (image with the noise square on the right). A "book" of four of such pages for a given noise level and sub-band is presented to five observers. Each observer is asked to determine whether the image with the "noise square" is at the right or left on a page. The location of the two images on each page is random. The observers are allowed to hold the printed images (5.12×5.12 inches each; note that FIG. 29 presents smaller images containing the salient portions of the 5.12×5.12 inch images) at a comfortable distance which they determine, as they ordinarily would look at a picture printed on an 8.5×11 inch page. Thus, the viewing distance could vary from approximately 10 to 30 inches, or about 2 to 6 times the image height. The observers are also allowed to choose the lighting conditions for comfortable viewing. The energy level of the noise of the "noise square" added to the one sub-band is adjusted in repeated analysis until the observers can not reliably determine which image contains the "noise square". By this technique, a level of rms noise, e.g., the maximum imperceptible rms noise, is determined for the subband in question. This procedure is then repeated for each of the 16 sub-bands.

The micro-dither discussed above not only removes objectionable contouring but also allows the illustrative analysis to have meaning. As discussed above, without micro-dither, the screening procedure produces 33 regular patterns corresponding to the 33 gray levels. The eye is extremely sensitive to any irregularity in the pattern, even to a difference of a single dot. Thus, the closer the gray level to one of the 33 levels, the lower the amplitude of noise that could be detected. The addition of the micro-dither breaks the regularity of the patterns and removes this artificial sensitivity around the 33 gray levels. Without it, a small amount of additive noise would be noticeable and the perceptual analysis would yield little useful information. The addition of micro-dither may not be necessary if some other halftoning technique is used, for example, error diffusion or least squares halftoning.

DPCM Stepsize

The stepsize, S, of the DPCM coders 25 is given by the following expression:

$$S(x,y,i,j) = 2\sqrt{3} \cdot Base(i,j) \cdot [E_T(x,y)]^{W_t} \cdot [B(x,y)]^{W_b} \quad (41)$$

where $S(x,y,i,j)$ is the stepsize of the coder corresponding to the $x^{th}$ $y^{th}$ pixel and the $i^{th}$ $j^{th}$ sub-band; $Base(i,j)$ is the base sensitivity of the $i^{th}$ $j^{th}$ sub-band; $E_T(x,y)$ is the texture masking adjustment for the $x^{th}$ $y^{th}$ pixel and $W_t$ is an empirical weighting factor equal to 0.15; and $B(x,y)$ is a brightness adjustment with $W_b$ as an empirical weighting factor equal to 1.0 (sub-band sensitivities and brightness and texture adjustments are discussed below). This expression corresponds to the operation of the illustrative embodiment discussed with reference to FIG. 5.

Sub-Band Sensitivities

Figure 30:
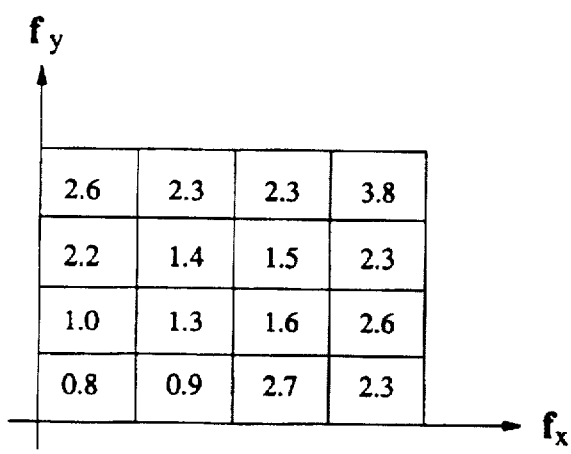
FIG. 30 presents results of a perceptual analysis for sub-band base sensitivities.

The results of the perceptual analysis for sub-band sensitivities are given in FIG. 30. Each box contains the root mean square noise sensitivity threshold for one of the 16 sub-bands which comprise all combinations of the four horizontal (index i) and four vertical (index j) spatial frequency partitions. The values in the figure, $Base(i,j)$, are conservative, since each number was chosen to be the minimum value over the observer data for each subband (except for few outlying data anomalies).

Brightness Adjustment

Figure 31:
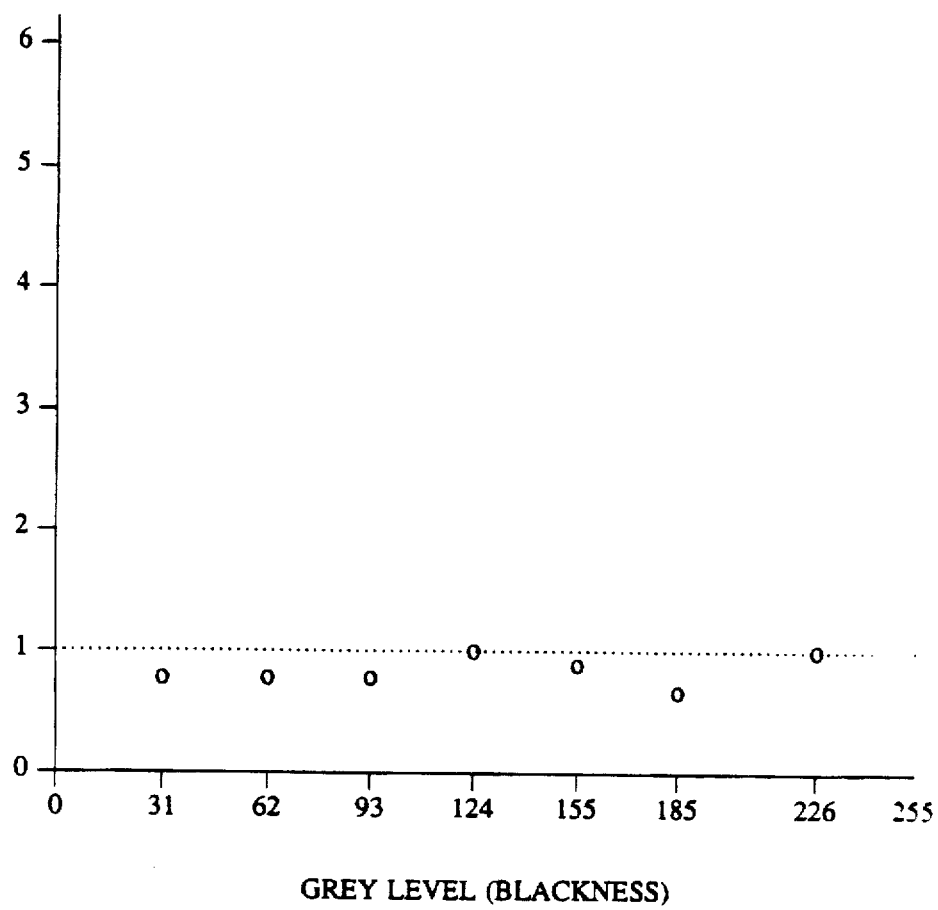
FIG. 31 presents an illustrative factor for brightness adjustment.

An illustrative factor for the brightness adjustment 103 is given by the following expression:

$$B(x,y) = F(mean + \frac{1}{4}[sb(x,y,0,0) + sb(x,y+1,0,0) + sb(x+1,y,0,0) + sb(x+1,y+1,0,0)]) \quad (42)$$

where F is the illustrative function plotted in FIG. 31, mean is the mean gray level for subband (0,0), and $sb(x,y,i,j)$ is the gray level of sub-band (i,j) at location (x,y). This illustrative function F is derived by repeating the perceptual analysis for subband (0,0) with different background image intensity levels. The illustrative perceptual analysis indicates that for printers, the human visual system is equally sensitive to noise in all gray levels. The illustrative function presented in FIG. 31 is a constant across all levels and represents an approximation of empirically derived data shown in the figure as circles.

Texture Masking Adjustment

An illustrative factor for texture masking is given by the following expression:

$$E_T(x,y) = \sum_{i=0}^{3} \sum_{j=0}^{3} K(i,j) \cdot Variance[sb(x,y,i,j)] \quad (43)$$

where $K(ij)$ is a weighting factor determined empirically from the modulation transfer function of the eye. For example, $K(ij)$ is specified by the following matrix:

| 1.414  | 1.414 | 0.3535  | 0.17675  |
|--------|-------|---------|----------|
| 1.414  | 1.0   | 0.25    | 0.125    |
| 0.3535 | 0.25  | 0.0625  | 0.03125  |
| 0.1767 | 0.125 | 0.03125 | 0.015625 |

Figure 5:
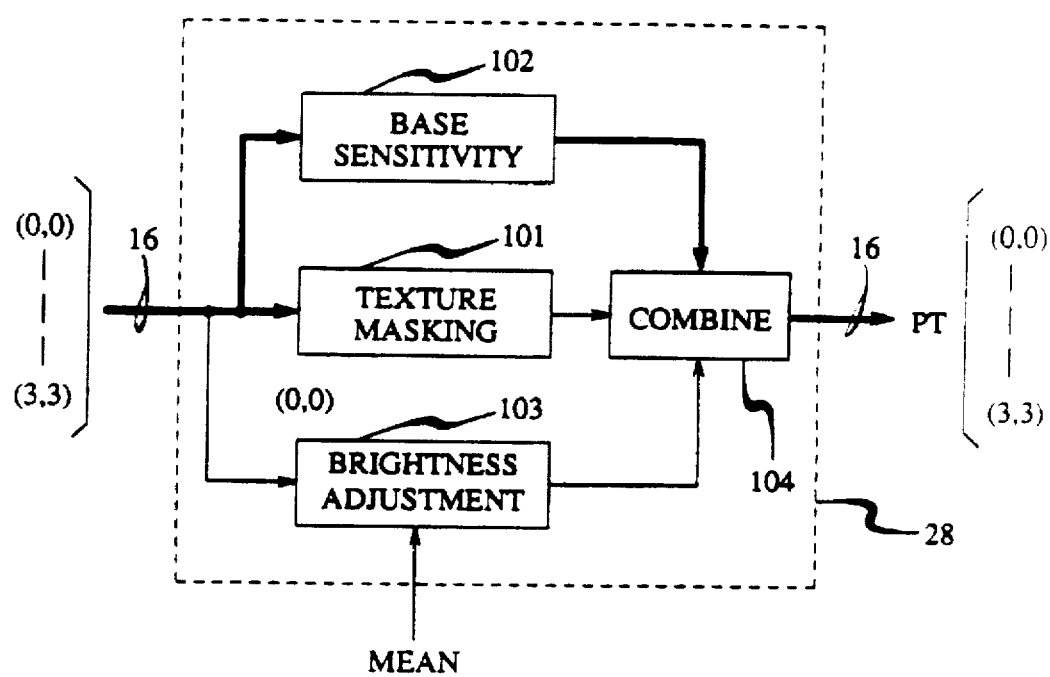
FIG. 5 depicts the signal flow in the perceptual modeling according to our invention.

In the coder presented above with reference to FIGS. 2, 5, and 7, the DPCM step-size is fixed for each sub-band and is chosen so that the perceptual threshold is met at every point in the image. When the brightness adjustment factor is flat, as is the case for printers, the stepsize is determined by the area of the image with the least amount of texture. Thus, the texture masking adjustment 101 discussed generally above has the most effect on a coder for use with laser printers when texture is present throughout the image.

Halftoner and Printer Characteristics

The illustrative embodiment of the present invention may be augmented to provide flexibility for operation with any halftoner 800 and printer 900 combination. In operating with the given halftoner 800 and printer 900 combination discussed above, the coder 25 of the illustrative embodiment incorporates a perceptual model 28 which is the result of the perceptual analysis conducted using the combination of a classical screening halftoner 800 and 300 dots/inch printer. However, the analysis may be repeated for any number of distinct halftoner 800 and printer 900 combinations. (For example, a perceptual analysis could be conducted on the combination of the printer model-based error diffusion halftoning technique discussed above, and a 300, 400, or 600 dots/inch printer.) By so doing, one or more perceptual models 28 may be made available to the coder 25 thereby providing the illustrative embodiment with the flexibility to operate with any such combination. A plurality of perceptual models 28 may be made available to the coder 25 in any of a number of ways. For example, data comprising individual perceptual models may be stored locally at gray encoder 500. Data for a particular perceptual model might then be selected manually (for use as perceptual model 28) by a user having knowledge of the particular halftoner 800/printer 900 combination in use, or selected automatically by a signal(s) received from, e.g., the halftoner 800/printer 900 combination (or a related device). Alternatively, data for a particular perceptual model may not be stored locally at the gray encoder 500 but rather communicated to it by, e.g., the halftoner 800/printer 900 combination.

In any case, it may be advantageous to group certain halftoner 800/printer 900 combinations together if differences in their perceptual models are not significant enough to warrant separate identification. Moreover, there may be provided a default set of data representing a worst case or catch all perceptual model for use if no combination-specific perceptual model data is known or available.

```
* MODIFIED ERROR DIFFUSION HALFTONING OF AN IMAGE
* USING 3 X 3 PRINTER MODEL
* USES BILINEAR INTERPOLATION TO EXPAND INPUT IMAGE
*
*   flag=1: FLOYD AND STEINBERG FILTER
*   flag=2: JARVIS, JUDICE AND NINKE FILTER
*        (STUCKI FILTER DEFINED SIMILARLY)
*
*
*   IMAGE IN: HEIGHT = h1 PIXELS
*   IMAGE IN: WIDTH = w1 PIXELS
*
*   IMAGE OUT: HEIGHT = h2 DOTS = h2_i INCHES
*   IMAGE OUT: WIDTH = w2 DOTS = w2_i INCHES
*
*   INK SPREADING PARAMETERS: alfa [.33]
*                             beta [.10]
*                             gama [.29]
*
*   PRINTER RESOLUTION: resol [300]
*
*
*   CONVERSION OF INCHES TO DOTS:  h2 = h2_i*resol
*   CONVERSION OF INCHES TO DOTS:  w2 = w2_i*resol
*
*/ error_diffusion(alfa,beta,gama,h1,h2,w1,w2,flag,ptin,ptim,pter,ptou)
float alfa, beta, gama;
int   h1, w1, h2, w2;
int   flag;
float *ptin;  /* POINTER TO ARRAY WITH INPUT IMAGE      (GREY-SCALE) */
float *ptim;  /* POINTER TO ARRAY WITH INTERPOLATED IMAGE (GREY-SCALE) */
float *pter;  /* POINTER TO ARRAY OF PAST ERRORS        (REAL NUMBER) */
int   *ptou;  /* POINTER TO ARRAY WITH OUTPUT IMAGE     (BINARY)   */
{
    int i, j;
```

```
/* FIRST INTERPOLATE GREY SCALE IMAGE TO GRID RESOLUTION */ for(j = 0; j < h2; j++)
    {
        for(i = 0; i < w2; i++)
        {
            if(h2 != h1   w2 != w1)
                *(ptim+j*w2+i) = bilinear(i,j,ptin,h1,w1,h2,w2);
            else
                *(ptim+j*w2+i) = *(ptin+j*w1+i);
        }
    }

/* NOW APPLY MODIFIED ERROR DIFFUSION */

/* INITIALIZE ERROR IMAGE TO ZERO */ for(j = 0; j < h2; j++)
        for(i = 0; i < w2; i++)
            *(pter+j*w2+i) = 0.;

for(j = 0; j < h2; j++)
    {
        for(i = 0; i < w2; i++)
        {
            float pixin, pixink, pixou, ddd;
            unsigned char upix;

pixin = *(ptim+j*w2+i);

/* pixin: CURRENT GREY-SCALE VALUE          */
            /* pter: POINTER TO ARRAY CONTAINING PAST ERRORS */

/* APPLY ERROR DIFFUSION FILTER TO PAST ERRORS */
            /* AND ADD TO CURRENT IMAGE VALUE             */ if(flag == 1) pixin += er_dif_flt1(pter,w2,i,j);
```

- 43 -

```
        if(flag == 2) pixin += er_dif_flt2(pter,w2,i,j);

/* THRESHOLD TO GET NEW BINARY POINT */ pixou = ((pixin < 128 ? 0 : 255));

/* GIVEN NEW BINARY POINT UPDATE ERROR */
    /* USING PRINTER MODEL              */ if(pixou == 255)
        {
        /* NEW PIXEL IS WHITE:                */
        /* INK SPREADING FROM KNOWN NEIGHBORS HAS ALREADY BEEN ADDED */

*pter += pixin-pixou;
        }
        else
        {
        /* NEW PIXEL IS BLACK:                */
        /* ADD INK-SPREADING CONTRIBUTION TO ALL WHITE NEIGHBORS   */
        /* (INCLUDING POINTS IN THE FUTURE, WHICH ARE TEMPORARILY  */
        /* ASSUMED WHITE; IF THEY TURN OUT TO BE BLACK,            */
        /* INK-SPREADING WILL BE SUBTRACTED AS IS DONE BELOW FOR   */
        /* CURRENT POINT)                     */

/* DEFINE a, b, c, d TO BE THE ALREADY ASIGNED OUTPUT BITS */
        /* AND nw, nn, ne, ww, xx, ee, sw, ss, sw TO BE POINTERS   */
        /* TO THE ELEMENTS OF THE ERROR ARRAY IN THE CURRENT WINDOW */
        /* AS FOLLOWS (nw STANDS FOR NORTH WEST ETC.               */

/*      c b a    nw nn ne          */
        /*      d x .    ww xx ee          */
        /*      . . .    sw ss se          */ int a, b, c, d;
    float *nn, *ss, *ww, *ee;
    float *nw, *ne, *sw, *se;
```

```
                *pter = pixin-pixou;   /* BLACK PIXEL: REMOVE PREVIOUS INK */ if(i < w2-1 && j > 0) a = *(ptou+1-w2);
                else            a = -1;
                if(j > 0)       b = *(ptou-w2);
5               else            b = -1;
                if(i > 0 && j > 0) c = *(ptou-1-w2);
                else            c = -1;
                if(i > 0)       d = *(ptou-1);
                else            d = -1;

10              nn = pter-w2;
                ss = pter+w2;
                ww = pter-1;
                ee = pter+1;
                nw = pter-w2-1;
15              ne = pter-w2+1;
                sw = pter+w2-1;
                se = pter+w2+1;

if(d == 255)
                {
20                *ww += alfa*255;

if(c == 0)
                  {
                        *ww -= beta*255;
                  }
25              }
                if(b == 255)
                {
                  *nn += alfa*255;

if(c == 0)
30                {
                        *nn -= beta*255;
                  }
```

- 45 -

```
            if(a == 0)
            {
                    *nn -= beta*255;
            }
        }
        if(i < w2-1)
        {
           *ee += alfa*255;

if(a == 0)
            {
                    *ee -= beta*255;
            }
        }
        if(j < h2-1)
        {
           *ss += alfa*255;
        } if(a == 255 && b == 255)
        {
           *ne += gama*255;
        }
        if(b == 255 && c == 255 && d == 255)
        {
           *nw += gama*255;
        }
        if(d == 255 && j < h2-1)
        {
           *sw += gama*255;
        }
        if(i < w2-1 && j < h2-1)
        {
           *se += gama*255;
        } if(a == 255 && b == 0)
```

```
      {
         *ee -= gama*255;
      }
      if(b == 255 && c == 255 && d == 0)
      {
         *nn -= gama*255;
      }
      if(b == 0 && c == 255 && d == 255)
      {
         *ww -= gama*255;
      }
      if(d == 0 && j < h2-1)
      {
         *ss -= gama*255;
      }
            }
            pter++;

/* ASSIGN COMPUTED BINARY VALUE TO OUTPUT ARRAY */

*(ptou++) = (int) pixou;
         }
      }
   return();
} float bilinear(i,j,img1,h1,w1,h2,w2)
int   i,j,h1,w1,h2,w2;
float *img1;
{
/*
* BILINEAR INTERPOLATION FILTER
*
* img1: ORIGINAL FLOATING IMAGE ( h1 X w1 )
*
```

= 47 -

Johnston-Neuhoff-Pappas-Safi k 30-9-10-21

```
     * outpix: FLOATING VALUE OF INTERPOLATED IMAGE ( h2 X w2 )
     *        AT LOCATION [j][i]
     */ float outpix, aaaa, bbbb, cccc, dddd;
5       float y_fctr, x_fctr, y, x;
        int   xp, xn, yp, yn;

/*
     * (y,x) IS THE LOCATION OF THE CURRENT PIXEL (j,i) IN img1 COORDINATES.
     * xp: IS THE PREVIOUS HORIZONTAL LOCATION
10   * xn: IS THE NEXT HORIZONTAL LOCATION
     * yp: IS THE PREVIOUS VERTICAL LOCATION
     * yn: IS THE NEXT VERTICAL LOCATION
     *
     */
15      y_fctr = ((float) h1)/((float) h2);
        x_fctr = ((float) w1)/((float) w2);

y = y_fctr*j;
        x = x_fctr*i;

xp = (int) x;
20      xn = xp+1;
        yp = (int) y;
        yn = yp+1;

aaaa = x-xp;
        bbbb = yn-y;
25      cccc = xn-x;
        dddd = y-yp;

if(xn >= w1) xn = xp;
        if(yn >= h1) yn = yp;

outpix  = *(img1+yn*w1+xp)*dddd*cccc;
30      outpix += *(img1+yp*w1+xp)*bbbb*cccc;
```

- 48 -

```
            outpix += *(img1+yp*w1+xn)*aaaa*bbbb;
            outpix += *(img1+yn*w1+xn)*aaaa*dddd;

return(outpix);
        }

5       float er_dif_fit1(pter,w2,i,j)
        int    w2,i,j;
        float *pter;
        {
        /*
10       * FLOYD AND STEINBERG;
         *
         * pter: POINTER TO CURRENT ERROR PIXEL (ERROR IMAGE: h2 X w2 )
         *
         */

15          float flterr, cons;

/* COMPUTE NORMALIZING CONSTANT FOR FILTER:       */
        /* CONSTANT IS FIXED FOR THE IMAGE, EXCEPT AT BOUNDARY POINTS */ cons = 0.;

if(j > 0) cons += 5;
20          if(i > 0)
            {
                    cons += 7;
                    if(j > 0) cons += 1;
            }
25          if(i < w2-1 && j > 0) cons += 3;

/* FILTER PAST ERRORS:    */
        /* CHECK FOR BOUNDARY POINTS */ flterr = 0.;
```

```
        if(j > 0) flterr += *(pter-w2)*(5/cons);
        if(i > 0)
        {
                flterr += *(pter-1)*(7/cons);
5               if(j > 0) flterr += *(pter-w2-1)/cons;
        }
        if(i < w2-1 && j > 0) flterr += *(pter-w2+1)*(3/cons);

return(flterr);
    }

10  float er_dif_flt2(pter,w2,i,j)
    int   w2,i,j;
    float *pter;
    {
    /*
15   * JARVIS, JUDICE AND NINKE
     * (STUCKI FILTER DEFINED SIMILARLY)
     *
     * pter: POINTER TO CURRENT ERROR PIXEL (ERROR IMAGE: h2 X w2 )
     *
20   */ float flterr, cons;

/* COMPUTE NORMALIZING CONSTANT FOR FILTER:        */
    /* CONSTANT IS FIXED FOR THE IMAGE, EXCEPT AT BOUNDARY POINTS */ cons = 0.;

25      if(j > 0) cons += 7;
        if(j > 1) cons += 5;
        if(i > 0)
        {
                cons += 7;
30              if(j > 0) cons += 5;
                if(j > 1) cons += 3;
```

```
            }
            if(i > 1)
            {
                    cons += 5;
 5                  if(j > 0) cons += 3;
                    if(j > 1) cons += 1;
            }
            if(i < w2-1)
            {
10                  if(j > 0) cons += 5;
                    if(j > 1) cons += 3;
            }
            if(i < w2-2)
            {
15                  if(j > 0) cons += 3;
                    if(j > 1) cons += 1;
            }

/* FILTER PAST ERRORS:   */
        /* CHECK FOR BOUNDARY POINTS */

20      flterr = 0.;

if(j > 0) flterr += *(pter-w2)*(7/cons);
        if(j > 1) flterr += *(pter-w2-w2)*(5/cons);
        if(i > 0)
        {
25              flterr += *(pter-1)*(7/cons);
                if(j > 0) flterr += *(pter-w2-1)*(5/cons);
                if(j > 1) flterr += *(pter-w2-w2-1)*(3/cons);
        }
        if(i > 1)
30      {
                flterr += *(pter-2)*(5/cons);
                if(j > 0) flterr += *(pter-w2-2)*(3/cons);
                if(j > 1) flterr += *(pter-w2-w2-2)/cons;
        }
```

Johnston-Neuhoff-Pappas-Saf: k 30-9-10-21

```
        if(i < w2-1)
        {
                if(j > 0) flterr += *(pter-w2+1)*(5/cons);
                if(j > 1) flterr += *(pter-w2-w2+1)*(3/cons);
5       }
        if(i < w2-2)
        {
                if(j > 0) flterr += *(pter-w2+2)*(3/cons);
                if(j > 1) flterr += *(pter-w2-w2+2)/cons;
10      } return(flterr);
}
```

We claim:

1. A method of coding a first image based on one or more levels of imperceptible noise, the first image comprising a gray scale image represented by one or more signals, the method comprising the steps of:
   1. determining the one or more levels of imperceptible noise based on
      a. an analysis of a noise masking capability of a halftone display process, and
      b. an analysis of a noise masking capability of the one or more signals representing the first image to be coded; and
   2. encoding the first image to produce one or more encoded values without introducing in a value noise which exceeds a determined level of imperceptible noise associated with the value.

2. The method of claim 1 wherein the step of encoding comprises the step of filtering the first image to produce a plurality of sub-bands.

3. The method of claim 1 wherein the step of encoding comprises the step of quantizing one or more signal values of the first image, based on a quantization stepsize, to produce encoded values and wherein the quantization stepsize is a function of said determined level of imperceptible noise.

4. The method of claim 1 wherein the analysis of the noise masking capability, of a halftone display process comprises an analysis of a set of images generated by a device for displaying halftone images.

5. The method of claim 4 wherein the analysis of a set of images generated by a device for displaying halftone images comprises a comparison of two images to determine which includes additive noise.

6. The method of claim 5 wherein the comparison of the two images is performed under one or more conditions determined by a person doing the comparison.

7. The method of claim 6 wherein the conditions comprise viewing distance.

8. The method of claim 6 wherein the conditions comprise lighting level.

9. The method of claim 4 wherein the analysis of a set of images generated by a device for displaying halftone images comprises a determination of values of one or more parameters of the levels of imperceptible noise and wherein the step of encoding comprises the step of determining the encoded values based on such parameters.

10. The method of claim 9 wherein the step of encoding comprises the step of filtering the first image to produce a plurality of sub-bands and wherein the parameters comprise a noise sensitivity parameter for a sub-band.

11. The method of claim 9 wherein the analysis the noise masking capability of one or more signals representing the first image comprises determining one or more values of an image brightness parameter and wherein the step of determining encoded values is further based on the one or more image brightness parameter values.

12. The method of claim 9 wherein the analysis the noise masking capability of one or more signals representing the first image comprises determining one or more values of a parameter representative of a deviation of image brightness from midgray image brightness and wherein the step of determining encoded values is further based on the one or more image brightness deviation parameter values.

13. The method of claim 9 wherein the analysis the noise masking capability of one or more signals representing the first image comprises determining one or more values of an image texture parameter and wherein the step of determining encoded values is further based on the one or more image texture parameter values.

14. The method of claim 1 further comprising the steps of communicating the one or more encoded values;
   decoding the encoded values to produce a representation of the first image; and
   displaying a representation of the first image.

15. The method of claim 14 wherein the step of communicating comprises the step of storing the encoded values.

16. The method of claim 14 wherein the step of displaying a representation of the first image comprises the step of determining a halftone image based on the representation of the first image.

17. The method of claim 16 wherein the step of determining a halftone image comprises the step of adding micro-dither to a representation of the first image.

18. The method of claim 16 wherein the step of determining a halftone image comprises the step of performing classical screening on a representation of the first image.

19. The method of claim 16 wherein the decoded representation of the first image comprises signal values and wherein the step of determining a halftone image comprises the step of interpolating to provide additional signal values for a representation of the first image.

20. The method of claim 19 wherein the step of determining a halftone image further comprises the step of adding micro-dither to the representation of the first image after the step of interpolating.

21. The method of claim 20 wherein the step of determining a halftone image further comprises the step of performing classical screening on the representation of the first image after the step of adding micro-dither.

22. The method of claim 16 wherein the halftone image is determined with a printer-model based halftoning technique.

23. A method of coding a first image based on one or more levels of perceptible noise, the first image comprising a gray scale image represented by one or more signals, the method comprising the steps of:
   1. determining the one or more levels of perceptible noise based on
      a. an analysis of a noise masking capability of the one or more signals representing the first image, and
      b. an analysis of a noise masking capability of a halftone display process; and
   2. encoding the first image to produce one or more encoded values without introducing in a value noise which exceeds a determined level of perceptible noise associated with the value.

24. The method of claim 23 wherein the step of encoding comprises the step of filtering the first image to produce a plurality of sub-bands.

25. The method of claim 23 wherein the step of encoding comprises the step of quantizing one or more signal values of the first image, based on a quantization stepsize, to produce encoded values and wherein the quantization stepsize is a function of said determined level of perceptible noise.

26. The method of claim 23 wherein the analysis of the noise masking capability of a halftone display process comprises an analysis of a set of images generated by a device for displaying halftone images.

27. The method of claim 26 wherein the analysis of a set of images generated by a device for displaying halftone images comprises a comparison of two images to determine which includes additive noise.

28. The method of claim 27 wherein the comparison of the two images is performed under one or more conditions determined by a person doing the comparison.

29. The method of claim 28 wherein the conditions comprise viewing distance.

30. The method of claim 28 wherein the conditions comprise lighting level.

31. The method of claim 26 wherein the analysis of a set of images generated by a device for displaying halftone images comprises a determination of values of one or more parameters of the levels of perceptible noise and wherein the step of encoding comprises the step of determining the encoded values based on such parameters.

32. The method of claim 31 wherein the step of encoding comprises the step of filtering the first image to produce a plurality of sub-bands and wherein the parameters comprise a noise sensitivity parameter for a sub-band.

33. The method of claim 31 wherein the analysis the noise masking capability of one or more signals representing the first image comprises determining one or more values of an image brightness parameter and wherein the step of determining encoded values is further based on the one or more image brightness parameter values.

34. The method of claim 31 wherein the analysis the noise masking capability of one or more signals representing the first image comprises determining one or more values of a parameter representative of a deviation of image brightness from midgray image brightness and wherein the step of determining encoded values is further based on the one or more image brightness deviation parameter values.

35. The method of claim 31 wherein the analysis the noise masking capability of one or more signals representing first image comprises determining one or more values of an image texture parameter and wherein the step of determining encoded values is further based on the one or more image texture parameter values.

36. The method of claim 23 further comprising the steps of:

communicating the one or more encoded values;

decoding the encoded values to produce a representation of the first image; and displaying a representation of the first image.

37. The method of claim 36 wherein the step of communicating comprises the step of storing the encoded values.

38. The method of claim 36 wherein the step of displaying a representation of the first image comprises the step of determining a halftone image based on the representation of the first image.

39. The method of claim 38 wherein the step of determining a halftone image comprises the step of adding micro-dither to a representation of the first image.

40. The method of claim 38 wherein the step of determining a halftone image comprises the step of performing classical screening on a representation of the first image.

41. The method of claim 38 wherein the decoded representation of the first image comprises signal values and wherein the step of determining a halftone image comprises the step of interpolating to provide additional signal values for a representation of the first image.

42. The method of claim 41 wherein the step of determining a halftone image further comprises the step of adding micro-dither to the representation of the first image after the step of interpolating.

43. The method of claim 42 wherein the step of determining a halftone image further comprises the step of performing classical screening on the representation of the first image after the step of adding micro-dither.

44. The method of claim 38 wherein the halftone image is determined with a printer model based halftoning technique.

45. A method of coding a first image based on one or more quantization stepsizes, the first image comprising a gray scale image represented by one or more signals, the method comprising the steps of:

1. determining the one or more quantization stepsizes based on
   a. an analysis of a noise masking capability of a halftone display process, and
   b. an analysis of a noise masking capability of the one or more signals representing the first image to be coded; and
2. encoding the first image to produce one or more encoded values based on said determined stepsizes.

* * * * *